(12) United States Patent
Hayashi

(10) Patent No.: US 11,778,557 B2
(45) Date of Patent: Oct. 3, 2023

(54) LOCATION DETERMINATION BASED ON BEACON SIGNAL TRANSMISSION TO ENABLED DEVICES

(71) Applicant: Luis Marcelo Hayashi, Sao Paulo (BR)

(72) Inventor: Luis Marcelo Hayashi, Sao Paulo (BR)

(73) Assignee: Luis Marcelo Hayashi

( * ) Notice: Subject to any disclaimer, the term of this patent is extended or adjusted under 35 U.S.C. 154(b) by 58 days.

(21) Appl. No.: 17/254,230

(22) PCT Filed: Jun. 21, 2018

(86) PCT No.: PCT/IB2018/000823
§ 371 (c)(1),
(2) Date: Dec. 18, 2020

(87) PCT Pub. No.: WO2019/243856
PCT Pub. Date: Dec. 26, 2019

(65) Prior Publication Data
US 2021/0274442 A1   Sep. 2, 2021

(51) Int. Cl.
*H04W 52/02* (2009.01)
*H04B 1/44* (2006.01)
(Continued)

(52) U.S. Cl.
CPC .......... *H04W 52/0229* (2013.01); *H04B 1/44* (2013.01); *H04W 4/027* (2013.01);
(Continued)

(58) Field of Classification Search
CPC ... H04W 52/0229; H04W 4/027; H04W 4/08; H04W 52/0235; H04W 52/0254;
(Continued)

(56) References Cited

U.S. PATENT DOCUMENTS

| 8,526,884 B1 | 9/2013 | Price et al. |
| 2008/0309457 A1* | 12/2008 | Jones ............... G08C 17/00 340/5.64 |

(Continued)

FOREIGN PATENT DOCUMENTS

| CN | 1618207 A | 5/2005 |
| CN | 107530011 A | 1/2018 |

(Continued)

OTHER PUBLICATIONS

International Search Report for International Application No. PCT/IB2018/000823 dated Feb. 15, 2019, 11 pages.

*Primary Examiner* — Shaima Q Aminzay

(57) ABSTRACT

A device and method for communicating identifying information to a nearby portable electronic device is disclosed. A low energy electronic device comprises a transceiver operable to transmit and receive signals and a processing unit in communication with the transceiver. The processing unit, in response to being activated by user input, switches the transceiver into a one-way communication mode, wherein the transceiver transmits a generic wake-up signal comprising a generic wake-up identifier for a first time period, and transmits a user identifier signal comprising a user identifier for a second time period after the first time period as elapsed. The processing unit then switches the transceiver into a two-way communication mode after the second time period has elapsed to facilitate receipt of an incoming confirmation signal.

17 Claims, 10 Drawing Sheets

(51) Int. Cl.
*H04W 4/02* (2018.01)
*H04W 4/08* (2009.01)
*H04M 1/72412* (2021.01)

(52) U.S. Cl.
CPC ......... *H04W 4/08* (2013.01); *H04W 52/0235* (2013.01); *H04W 52/0254* (2013.01); *H04M 1/72412* (2021.01); *H04M 2250/10* (2013.01); *H04M 2250/12* (2013.01)

(58) Field of Classification Search
CPC ........... H04W 4/06; H04W 4/02; H04W 4/70; H04B 1/44; H04M 1/72412; H04M 2250/10; H04M 2250/12
USPC ........................................................ 455/547
See application file for complete search history.

(56) References Cited

U.S. PATENT DOCUMENTS

| | | |
|---|---|---|
| 2013/0041961 A1 | 2/2013 | Thrower, III et al. |
| 2016/0150375 A1 | 5/2016 | Yogeeswaran et al. |
| 2016/0378174 A1 | 12/2016 | Meng et al. |
| 2018/0040229 A1* | 2/2018 | Munusamy ............. H04W 4/80 |

FOREIGN PATENT DOCUMENTS

| | | | |
|---|---|---|---|
| KR | 2003-0074710 A | 9/2003 | |
| KR | 2018-0034423 A | 4/2018 | |

\* cited by examiner

LOCATION DETERMINATION BASED ON BEACON SIGNAL TRANSMISSION TO ENABLED DEVICES

BACKGROUND

Electronic devices, and particularly portable electronic devices, have become extremely powerful and useful, particularly when use of such devices is coupled with and takes advantage of and utilizes wireless technology, such as short-range wireless technology (e.g., wireless transmissions via a Bluetooth protocol), cellular technology, and global positioning system (GPS) technology. Indeed, one of the more prevalent capabilities and uses of electronic devices is to facilitate location determination of a user or object. Location determination technology can be used for a variety of purposes, including, but not limited to, general convenience purposes, tactical purposes, as well as for personal safety purposes.

With respect to location tracking of people and objects, such as a car or product, the effort needed to accurately track an object's location can be prohibitive, in terms of cost and time. To accomplish such tracking with conventional means, a powerful transmitter can be included with the object or person as well as a plurality of receivers at any point the object or person may travel to.

With respect to personal safety and security, such as when a user experiences an emergency or other distressing situation, the time needed to access a portable electronic device having location determination capabilities, such as a mobile smart phone, and then access a relevant communication application available on the portable electronic device can represent an unacceptable delay. In some situations the user may be unable to initiate communication altogether, such as due to being incapacitated or as a result of some other limiting factor. Dedicated transmission devices that pair and communicate over relatively short distances with a portable electronic device can reduce that delay time, or enable communication automatically. However, if the paired portable electronic device is out of range (i.e., not near or proximate the user and the dedicated transmission device within a certain range) the dedicated transmission device may not be able to communicate with its intended receiver or recipient.

BRIEF DESCRIPTION OF THE DRAWINGS

Features and advantages of example embodiments will be apparent from the detailed description which follows, taken in conjunction with the accompanying drawings, which together illustrate, by way of example, features; and, wherein.

Figure 1:
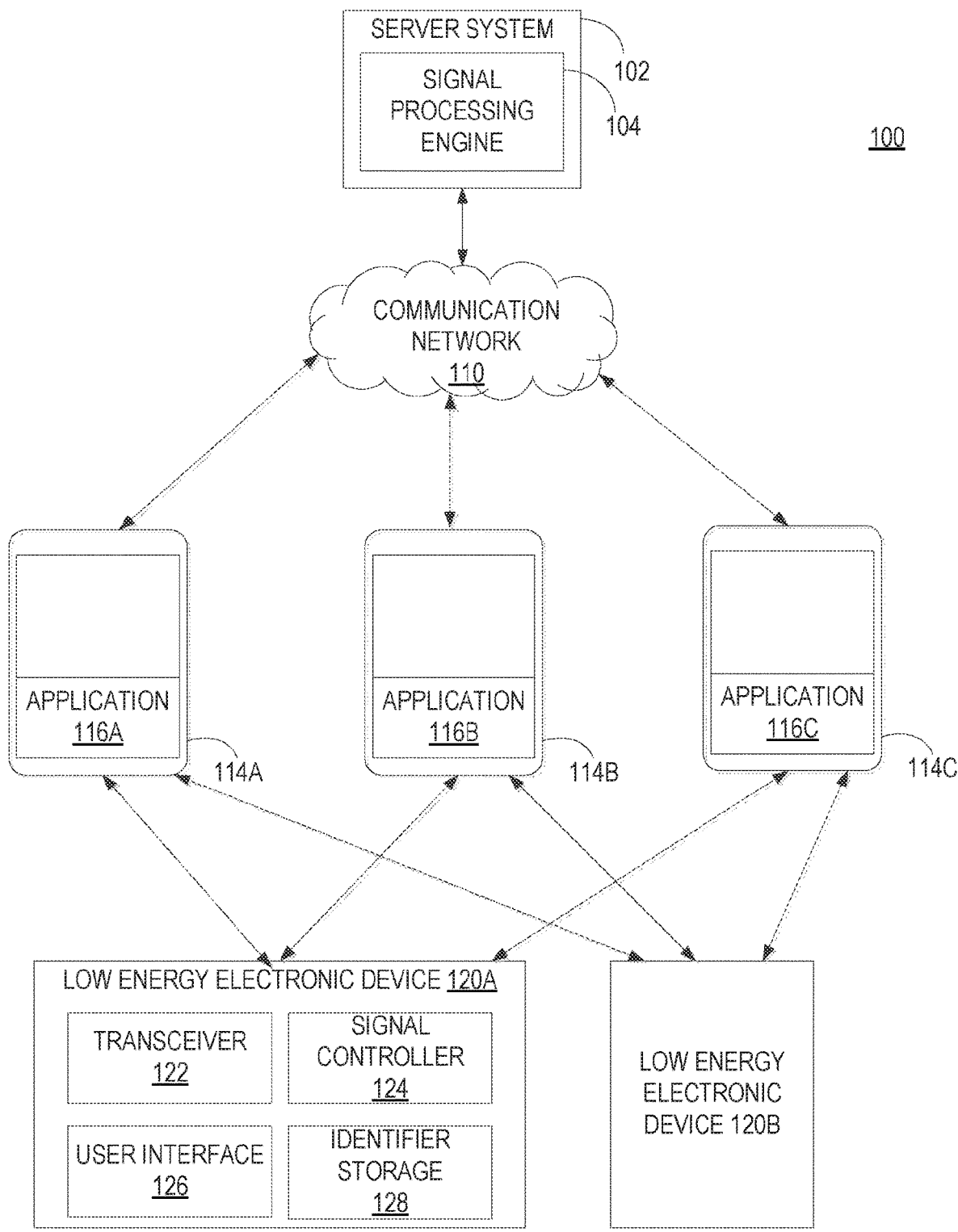
FIG. 1 illustrates an example server-client system for enabling a personal emergency electronic device in accordance with an example of the present disclosure.

Reference will now be made to the exemplary embodiments illustrated, and specific language will be used herein to describe the same. It will nevertheless be understood that no limitation on scope is thereby intended.

DESCRIPTION OF EMBODIMENTS

Before technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to convey a thorough understanding of various technology embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "an" engine includes a plurality of such engines.

Reference throughout this specification to "an example" means that a particular feature, structure, or characteristic described in connection with the example is included in at least one invention embodiment. Thus, appearances of the phrases "in an example" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member.

Thus, no individual member of such list should be construed as a de facto equivalent of any other member of the same list solely based on their presentation in a common group without indications to the contrary. In addition, various invention embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps can be performed, and certain of the stated steps can possibly be omitted and/or certain other steps not described herein can possibly be added to the method.

As used herein, comparative terms such as "increased," "decreased," "better," "worse," "higher," "lower," "enhanced," "minimized," "maximized," "increased," "reduced," and the like refer to a property of a device, component, function, or activity that is measurably different from other devices, components, or activities in a surrounding or adjacent area, in a single device or in multiple comparable devices, in a group or class, in multiple groups or classes, related or similar processes or functions, or as compared to the known state of the art. For example, a data region that has an "increased" risk of corruption can refer to a region of a memory device, which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases, depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element can still actually contain such item as long as there is no measurable effect thereof.

As used herein, the term "about" is used to provide flexibility to a numerical range endpoint by providing that a given value can be "a little above" or "a little below" the endpoint. However, it is to be understood that even when the term "about" is used in the present specification in connection with a specific numerical value, that support for the exact numerical value recited apart from the "about" terminology is also provided.

The term "coupled," as used herein, is defined as directly or indirectly connected in an electrical or nonelectrical manner. "Directly coupled" items or objects are in physical contact and attached to one another. Objects or elements described herein as being "adjacent to" each other can be in physical contact with each other, in close proximity to each other, or in the same general region or area as each other, as appropriate for the context in which the phrase is used.

Numerical amounts and data can be expressed or presented herein in a range format. It is to be understood, that such a range format is used merely for convenience and brevity, and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually. This same principle applies to ranges reciting only one numerical value as a minimum or a maximum. Furthermore, such an interpretation should apply regardless of the breadth of the range or the characteristics being described.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, can take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term "processor" can include general purpose processors, specialized processors such as central processing units (CPUs), graphics processing units (GPUs), digital signal processors (DSPs), microcontrollers (MCUs), embedded controller (ECs), field programmable gate arrays (FPGAs), or other types of specialized processors, as well as base band processors used in transceivers to send, receive, and process wireless communications.

It should be noted that when a plurality of similar objects are depicted (e.g., FIG. 1 shows three portable electronic devices (114A to 114C) and two low energy electronic devices (120A and 120B)), the base number for that object may be used to refer to a general version of that object. Thus, if 120 is used to refer to a low energy electronic device it should be understood to be referring to low energy electronic devices generally, and not to a particular depicted object.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Aspects of the present technology are directed toward enabling a low energy electronic device to reliably communicate with a plurality of other devices. In some examples, the low energy electronic device can comprise a portable, self-contained (i.e., having a housing with the components, including a power supply, supported therein) low energy electronic device that can be carried by a user and used in emergency or other distressful situations, and that can comprise a housing in support of a transceiver, a user interface or input operable to initiate a user input or user input signal, a power supply, and a processing unit operable with the user interface and the transceiver to control the transceiver. The user interface can comprise an electromechanical user interface (e.g., a button), an electronic user interface (e.g., a touch screen), a biometric user interface, and others as will be apparent to those skilled in the art. In some examples, when a user activates the low energy electronic device via the user interface or input, the processing unit sets or switches the transceiver into a one-way communication mode and begins transmitting signals.

In some examples, a low energy electronic device is a device that has a power consumption less than 0.5 Watts and a peak current consumption of less than 15 milliamps (mA). In some examples, the average current consumption of a low energy electronic device is less than 500 micro amps (μA).

In some examples, the one-way communication mode transmits a generic wake-up signal for a first period of time, which can be any desired duration of time (e.g., between 1 and 5 seconds, or others). The one-way communication mode can use a communication protocol based on a Beacon communication protocol. One prior Beacon communication protocol typically involves broadcasting a unique identifier for the device as well as two supplemental values (called the major and minor values). However, the present technology utilizes a beacon communication protocol different from those in the prior art, and that is customized to the specific needs of the present technology.

In one example, all low energy electronic devices that implement this unique beacon communication protocol can have the same source identifier (which can comprise a 16 byte value that is also called a universal unique identifier (UUID)). Thus, to a receiver, each low energy electronic device has and transmits to the receiver the same source identifier. In addition, the generic wake-up identifier and the user identifier are 32 bit values from the supplemental values increased (e.g., 16 bits each for a total of 32 bits), which can be used to transmit additional information. For example, a generic wake-up signal includes a source identifier (e.g., a UUID) and a generic wake-up identifier (a 32 bit value) in the major and minor values.

The generic wake-up signal allows the current technology to solve various problems associated with currently existing solutions. Specifically, existing solutions require a paired device (e.g., an electronic device capable to communicate long distances over network) to ensure that a personal low energy electronic device can connect to a server system. As a result, when the personal low energy electronic device is separated from the paired electronic device, the personal low energy electronic device is unable to communicate with the remote server, effectively rendering it inoperable.

The present technology overcomes this problem as described above, by allowing each low energy electronic device to connect to any portable electronic device that has the associated application installed thereon by enabling a generic wake-up signal. Thus, all users who have the application installed act as a network, each allowing the others to send messages through their respective portable electronic devices. This solution has the advantage of enabling much greater utility for each low energy electronic device without the additional cost of purchasing or otherwise enabling multiple portable electronic devices.

In some examples, the communication protocol can comprise a low energy proximity sensing protocol that can enable portable electronic devices (e.g., mobile phones, tablets, and others) within a close range (e.g., within 70 meters, but this is certainly not intended to be limiting in any way) to receive the transmissions. Thus, when the generic wake-up signal is transmitted, any portable electronic device within range can receive the signal.

Any such portable electronic device that has an installed application associated with the low energy electronic device can be configured, such that whenever it receives a communication that includes both the source identifier associated with the low energy electronic device and the generic wake-up identifier, it will cause the associated application to be activated in one or more ways. Thus, the low energy electronic device is not limited only to communicating with a paired portable electronic device, such as a specific smartphone of the same user in possession of the low energy electronic device. Instead, it can communicate with any portable electronic device within range that has the associated application installed. In this way, a user with a low energy electronic device can still send messages even if the actual paired portable electronic device (e.g., the user's own mobile phone) is out of range.

In some examples, when a portable electronic device, with the application installed, receives the generic wake-up signal, the portable electronic device recognizes the source identifier value (which is common to all personal emergency devices that implement the herein disclosed protocol) as well as the generic wake-up identifier in the supplemental values. In response, the receiving portable electronic device (or any electronic device with the application installed and the ability to receive the signal) will activate the application even if the application was in an off or inactive or dormant state.

Once the associated application on a particular portable electronic device has been activated, the application will monitor for future communications from the low energy electronic device. After the first time period, the processing unit (e.g., a signal controller) of the low energy electronic device stops directing the transceiver to transmit the generic wake-up signal and directs the transceiver to begin transmitting a user identifier signal. The user identifier signal includes the source identifier, which is transmitted with every outgoing signal from the low energy electronic device, and a user identifier associated with the specific low energy electronic device transmitting the signal. The user identifier is a value associated with the specific low energy electronic device and can be pre-established, such as with a server system, when the user is setting up the low energy electronic device. Like the generic wake-up identifier, the user identifier can be a 32 bit value.

The portable electronic device can store one or more user identifiers. A user identifier is stored at the portable electronic device when the low energy electronic device is registered or otherwise set-up. Once a portable electronic device registers a user identifier associated with a low energy electronic device, the portable electronic device and the low energy electronic device are considered paired. In general, users pair a low energy electronic device they own with a portable electronic device that they also own.

When the portable electronic device receives the user identifier signal (including the user identifier) from the low energy electronic device, the portable electronic device compares the received user identifier with one or more stored user identifiers. If the received user identifier matches a stored user identifier, the low energy electronic device from which the user identifier is received is determined to be paired with the receiving portable electronic device.

When the portable electronic device determines that the low energy electronic device is paired with the portable electronic device, the portable electronic device can perform a foreground function. A foreground function can comprise an action taken by the portable electronic device from an activated feature on the portable electronic device, and that is or becomes a primary function of the portable electronic device, which function or action can be perceptible and conspicuous. In contrast, a background function is a function that takes place in the background of a portable electronic device and is inconspicuous and largely unnoticeable.

In one example, a foreground function can comprise activating the camera or the microphone, or both, of the portable electronic device to record visual or audio data, or both, in the area of and nearby the portable electronic device for a predetermined time period. Other foreground functions are contemplated, as discussed herein. The portable electronic device can send the recorded visual and/or audio data as well as the user identifier and the location of the portable electronic device to a server system. This can occur via wireless communication with the server, such as via a cellular network. The predetermined time period can be any desired time period. For example, the time period can be less than one minute, more than one minute, can include different intervals or periods, or any oilier period of time or sequence of times.

Initiating a foreground function on the paired portable electronic device, such as recording visual and/or audio data from the camera and/or microphone of the portable electronic device, solves various problems associated with existing technologies. Specifically, current systems that notify users when a particular user has activated their low energy electronic device send very little information that would be of use to the receiving users, or that could be of a benefit to or assist the notifying user. This lack of information makes it difficult for receiving users to respond to a situation correctly.

Unlike current systems, with the present technology, the paired portable electronic device, through or via the installed application, sends the current location of the paired portable electronic device to the server system, as well as collects visual and audio data, such as of the user, at and near the portable electronic device. Being able to see and hear a situation that may have caused a user to activate a low energy electronic device provides significantly more information to the receiving user(s), allowing them to correctly respond, such as to what may be an emergency or distressing situation. This has clear advantages over other prior systems and methods, including those that only send text based messages in the event of an emergency. Existing solutions either relay very little information, take additional time to activate, or both. The technology disclosed herein has the advantage of being very quick to activate and providing as much information as possible.

In some examples, the server system determines, based on the user identifier, a pre-established group of users associated with the user identifier. For example, a user can connect his or her profile to the profiles of the user's family members or friends or any other individual or group of individuals. These people are then associated with or otherwise linked to the user identifier at the server system. In some examples, the server system transmits the location of the user's portable electronic device and any recorded audio or video data to the pre-established group of linked users. In other examples, the server system transmits an estimated location of the low energy electronic device to the pre-established group of users associated with the user identifier.

Using the locations of multiple portable electronic devices to estimate a location of a low energy electronic device solves a significant problem with services that require a user's location. Specifically, if a low energy electronic device does not know its own location, the location of a connected device can be used as an approximate location. However, depending on the specific range of the low energy electronic device, the possible area in which the low energy electronic device may be found is likely still quite large. In contrast, the present technology allows the location of the low energy electronic device to be estimated with more accuracy by relying on more than one portable electronic device for a potential location. This has the advantage of increasing accuracy without the additional cost of the user purchasing additional portable electronic devices or similar devices.

FIG. 1 illustrates an example server-client system 100 for enabling a low energy electronic device, such as a personal emergency (or other distressing situation) device (e.g., a panic button/device, a medical alert device, or others), in accordance with an example embodiment. In some examples, the server-client system 100 can include one or more low energy electronic devices (e.g., see low energy electronic devices 120A and 120B, each of which comprise the same or similar components and function), one or more portable electronic devices 114A-114C having an application 116A-116C stored thereon and associated with the low energy electronic devices 120A and 120B, and a server system 102. In some examples, the low energy electronic device(s) can connect to the one or more portable electronic devices via a short-range wireless connection, such as a Blue Tooth connection. One or more communication networks 110 interconnect the portable electronic devices (116A to 116C) and the server system 102. The communication networks 110 can be any of a variety of network types, including local area networks (LANs), wide area networks (WANs), wireless networks, wired networks, the Internet, personal area networks (PANs), or a combination of such networks, or others as will be apparent to those skilled in the art.

In some examples, the low energy electronic device 120A can include a transceiver 122, a processor or signal controller 124, a user interface or input 126, or an identifier storage 128. In some examples, the transceiver 122 is capable of transmitting in both a one-way mode and a two-way mode. In some examples, the signal controller 124 has logic and/or circuitry that controls the transmission mode and the content being transmitted. For example, in one-way mode, the signal controller 124 can use a communication protocol based on a beacon communication protocol to broadcast information. In addition, the low energy electronic device 120A can include a power source, such as a battery and any components needed to utilize the battery that is not pictured. In some examples, the low energy electronic device 120 can enable and disable the transceiver 122 for small amounts to time to preserve battery life.

One traditional Beacon communication protocol involves broadcasting a unique device identifier (UUID) for a beacon device, or a group of beacon devices with a common owner, (e.g., a 16 byte string) and two supplemental values. The supplemental values are a major value (e.g., a two byte string generally used to distinguish a smaller subset of beacon devices within a larger group) and a minor value (e.g., a two byte identifier used to identify individual beacon devices).

Unlike the traditional Beacon protocol, the Beacon protocol discussed herein has been modified or customized to better fit the needs of the disclosed system. The plurality of low energy electronic devices 120A and 120B (although any number of low energy electronic devices are contemplated) implementing the Beacon protocol discussed herein can comprise the same source identifier. In other words, the source identifier across the plurality of low energy electronic devices 120A and 120B is not unique to each of the plurality of low energy electronic devices 120A and 120B. With this Beacon protocol, the generic wake-up identifier and the user identifier are 32 bit values from the supplemental values (the major and the minor values) lengthened as 16 bits each (for a total of 32 bits), Certain values in the 32 bit range can be assigned as a user identifier to identify respective particular low energy electronic devices, as discussed in more detail below. In addition, one value in the 32 bit range can be established as a generic wake-up identifier that all portable electronic devices having the application installed can receive and recognize and respond to.

In some examples, the user interface or input 126 allows a user to interact with the low energy electronic device 120A to initiate a user input signal to the signal controller 124. For example, the user interface or input 126 could be one of an electromechanical user interface (e.g., a button), an electronic user interface (e.g., a touch screen, a microphone), a biometric user interface, and any others as will be recognized by those skilled in the art. A user can interact with the user input to initiate the user input signal to cause the low energy electronic device 120A to activate. For example, if the low energy electronic device comprises a personal and portable low energy electronic device (e.g., a panic button for use in emergency or other distressful situations) and the user input 126 comprises a button, the user can activate the low energy electronic device 120A by pressing the button, which generates the user input signal to be sent to the signal controller 124.

In response to activation of the low energy electronic device 120 by the user, the signal controller 124 places or switches the transceiver 122 into a one-way communication mode (e.g., from an off mode or sleep mode). In the one-way communication mode, the transceiver 122 transmits what can be termed a generic wake-up signal for a first time period. As noted above, the generic wake-up signal includes the source identifier (16 bytes) and a generic wake-up identifier (32 bit value from the major and minor values). Unlike conventional low energy electronic devices, each low energy electronic device of the present disclosure is configured to activate an application in response to the same generic wake-up identifier. As a result, any low energy electronic device (e.g., either low energy electronic device 120A or low energy electronic device 120B, or both) can wake up any portable electronic device (e.g., portable electronic devices 114A, 114B, or 114C, or any combination of these) that has the associated application installed, and that is within range of the low energy electronic device(s) to receive the generic wake-up signal with the generic wake-up identifier.

In some examples, a portable electronic device 114 uses a radio receiver to receive a variety of signals, A portable electronic device 114 can analyze some or all of the signals it detects. The portable electronic device 114, with the application 116 installed, can recognize the generic wake-up signal from one or more low energy electronic devices. In response, the portable electronic device 114 can activate the associated application 116 in one or more ways. In some examples, the application 116 is activated without otherwise activating the portable electronic device 114, such as in the background.

For example, a smartphone detecting the generic wake-up signal can activate the application to perform a passive or background function, but the application will not cause the portable electronic device to perform any active or foreground functions, such as to turn on its screen or unlock the device, or perform any other foreground functions. Instead, the application passively performs its processes in the background without other indications that the application 116 is running. In other examples, particularly in the case where the portable electronic device is paired to the specific low energy electronic device whose generic wake-up signal is being received, the application can cause the portable electronic device to activate and perform other more active foreground functions, as discussed herein.

A single low energy electronic device e.g., low energy electronic device 120A) can send a signal that is received by the plurality of portable electronic devices 114A-114C. In addition, each low energy electronic device 120A and 120 B can be paired with a respective particular portable electronic device (e.g., the phone of the user of the low energy electronic devices 120). For example, low energy electronic device 120A can be paired with portable electronic device 114A, which can comprise a smartphone of the user of the low energy electronic device 120A, and low energy electronic device 120B can be paired with portable electronic device 114B, which can comprise the smartphone of the user of the low energy electronic device 120B.

Although each low energy electronic device 120 is paired with one or more specific portable electronic devices 114, each of the low energy electronic devices 120A and 120B are operable to wake up any portable electronic device (e.g., portable electronic devices 114A, 114B, or 114C) within range and that has the associated application installed thereon due to the fact that the generic wake-up identifier is the same for low energy electronic devices 120A and 120B (or any others using the technology discussed herein). It is noted that although only two low energy electronic devices are shown in FIG. 1, any number of low energy electronic devices are contemplated, each of which will have the same generic wake-up identifier. Indeed, any low energy electronic device configured in accordance with the teachings as disclosed herein can be used to send a generic wake-up signal, each of which will comprise the same generic wake-up identifier, to any number of portable electronic devices within range and that have installed thereon the associated application to cause the portable electronic devices to activate in one or more ways, the specific way in which the portable electronic device is activated depending upon the particular low energy electronic device whose signal is being received.

In some examples, once the first time period has elapsed, the signal controller 124 changes the outgoing signal from the generic wake-up signal to a user identifier signal to be transmitted by the transceiver 122. The user identifier signal includes the source identifier and a user identifier. As noted above, the user identifier can be a 32 bit value uniquely associated with the transmitting low energy electronic device 120. In some examples, the signal controller 124 continues to direct the transceiver 122 to transmit the user identifier signal for a second time period. The user identifier signal is receivable by any portable electronic device within range.

In some examples, setting up a low energy electronic device 120A (e.g., initializing the device and/or or registering it with the sever system 102) includes pairing the low energy electronic device 120A with a specific portable electronic device portable electronic device 114A) and registering the low energy electronic device 120A with the server system 102. As part of a low energy electronic device 120 registration process, the low energy electronic device 120 can transmit a device registration request to the server system 102 via a particular portable electronic device 114. In some examples, portable electronic device 114 stores a user identifier for the low energy electronic device.

In some examples, the server system 102 generates a user identifier during the registration process. In other examples, the user identifier and a device identifier of the paired portable electronic device are stored by the server system 102, but the user identifier originated in the low energy electronic device 120A (e.g., as part of preparing the low energy electronic device for sale)). In some examples, the low energy electronic device 120A stores the source identifier, the generic wake-up identifier, and the user identifier in the identifier storage 128. It is noted that this same process can be carried out to initialize and register the low energy electronic device 1203, or any others, with a specific portable electronic device.

Once the second time period has elapsed, the signal controller 124 can switch the transceiver 122 into a two-way communication mode. In some examples, this two way communication mode can comprise a close proximity or short-range type of protocol, such as a Bluetooth communication protocol. In this mode, the transceiver 122 can receive a confirmation signal from one or more of the portable electronic devices 114A, 114B, and 114C. As discussed below, a confirmation signal may notify the low energy electronic device 120A that the user identifier has been received and transferred to the server system 102. In response to receiving a confirmation signal, the low energy electronic device 120A can switch into sleep mode and preserve battery life until activated again.

In some examples, one or more of the portable electronic devices 114A, 114B, 114C receive the user identifier from the low energy electronic devices 120. Each respective portable electronic device that receives the user identifier then determines whether the user identifier is from a low energy electronic device that is paired with the respective portable electronic device. This determination is made, as noted above, based on comparing the received user identifier with one or more user identifiers stored at the portable electronic device 114 (e.g., in the application 116). A user identifier can be stored at the portable electronic device 114 during registration of a low energy electronic device 120.

In accordance with a determination by the portable electronic device 114 that the low energy electronic device is paired with (or matches) the portable electronic device 114, the portable electronic device 114 activates a foreground function, such as activating the camera and/or microphone, and a record function to capture these. The camera and/or microphone capture local video and audio data for a predetermined amount of time. In some examples, the predetermined amount of time is 20 seconds, but can be any as described above. In some examples, a user may specify a particular predetermined amount of time.

Once the camera and microphone have been activated, the portable electronic device 114 can determine the order and timing at which the data is transmitted to the server system 102. This determination can be made based on user preferences or in accordance with pre-established data handing policies. In some examples, the portable electronic device waits until the camera and microphone are done recording and then transfers the recorded audio and visual data at the same time as the user identifier, device identifier, and the location of the portable electronic device 114. In other examples, the portable electronic device 114 transmits the user identifier, device identifier, and the location of the portable electronic device 114 to the server system 102 first and then transfers the recorded audio and visual data when the portable electronic device 114 finishes recording them. In yet other examples, the portable electronic device 114 sends the user identifier, device identifier, and the location of the portable electronic device 114 initially and then streams the audio and visual data as it is recorded. The portable electronic device 114 can use a communication network 110 to transfer the audio and visual data, user identifier, device identifier, and the location of the portable electronic device 114 to the server system 102.

In accordance with a determination by the portable electronic device 114 that the low energy electronic device is not paired with the portable electronic device 114, no foreground function on the portable electronic device is activated (e.g., the portable electronic device 114 does not activate the camera and/or microphone). In this way, a portable electronic device will not perform a foreground function for any low energy, electronic device 120 except for those that are paired with the portable electronic device 114.

In some examples, the portable electronic device can comprise a location determination module or system operable to determine a location of the portable electronic device. In one example, the location determination module can comprise a GPS enabled device or system. Other systems and methods include control plane locating, in which the portable electronic device allows a service provider to get its location based on the radio signal delay of the closest cell-phone towers (for situations in which the GPS signal is not available or the GPS service has been turned off). In addition, the portable electronic device may use crowd-sourced Wi-Fi data to identify a portable electronic device's location. These methods have the advantage of performing well in indoor environments. In other examples, a portable electronic device may use a combination of these techniques to identify its location. There are a number of additional methods that can enable location based services that the portable electronic device can use to determine its location that will be apparent to those skilled in the art.

A plurality of different portable electronic devices (114A-114C) can receive the user identifier and, in response, transmit their respective locations to the server system 120. Thus, the server system 102 can receive the user identifier from one or more portable electronic devices 114 and the respective location of each portable electronic device 114.

The server system 102 includes a signal processing engine 104. The signal processing engine 104 can receive data from one or more respective portable electronic devices 114A to 114C. In some examples, the received data can include, but is not limited to, a user identifier, a location of a respective portable electronic device 114A to 114C, a device identifier for a respective portable electronic device, an indicator of whether the respective portable electronic device is paired with the low energy electronic device 120 associated with the user identifier, audio data recorded by a respective portable electronic device, and visual data recorded by a respective portable electronic device.

The signal processing engine 104 can determine whether to transmit any or all of the received data to one or more other users (e.g., devices associated with the other users). In some examples, this determination can be made at the server system by determining which users are listed in a user profile associated with the user identifier as being grouped with the user profile.

In some examples, the signal processing engine 104 determines which data to transmit to the list of users based on the received indication of whether the sending portable electronic device 114 is paired with the user identifier. In accordance with a determination that the sending portable electronic device 114 is paired with the user identifier, the signal processing engine 104 can send the location of the sending portable electronic device 114 and any recorded audio or visual or other data, such as to those users that are in a group. In accordance with a determination that the sending portable electronic device 114 is not paired with the user identifier, the signal processing engine 104 can send an estimated location of the low energy electronic device 120. The process for estimating a location of a low energy electronic device 120 is explained in more detail below.

Figure 2:
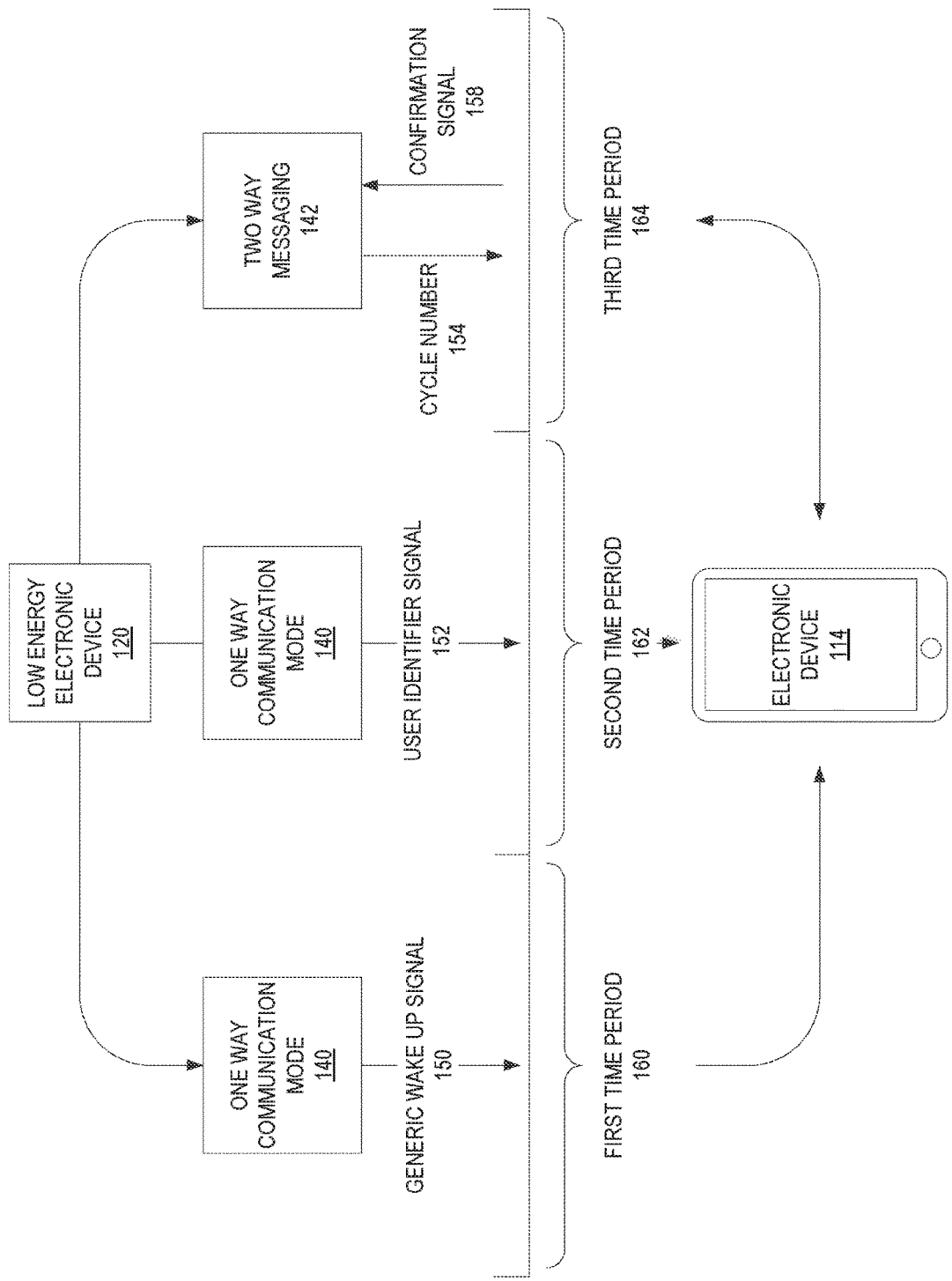
FIG. 2 is a flow diagram illustrating a process to enable communication between a low energy electronic device and a portable electronic device, in accordance with some examples.

FIG. 2 is a flow diagram illustrating communication between a low energy electronic device 120 and a portable electronic device 114, in accordance one example. In this example, the communication between a single low energy electronic device 120 (as shown in FIG. 1) and a single portable electronic device 114 is shown. With reference to FIGS. 1 and 2, the low energy electronic device 120 transmits a message in one-way communication or message mode 140. In some examples, the low energy electronic device 120 sends a generic wake-up signal 150 to the portable electronic device 114. A generic wake-up signal 150 includes a source identifier and a generic wake-up identifier. As noted above, the source identifier is a 16 byte value which is sent by all low energy electronic devices 120 associated with the disclosed technology. The generic wake-up identifier can be a 32 bit value pre-established to activate an associated application on each portable electronic device 114 that has the application installed.

The low energy electronic device 120 continues broadcasting the generic wake-up signal 150 for a first time period 160. Once the first time period 160 has elapsed, the low energy electronic device 120 switches the transmitted message from the generic wake-up signal 150 to the user identifier signal 152. The user identifier signal includes the source identifier and a user identifier, which can be a 32 bit value that identifies a particular low energy electronic device 120 and which can also be associated with a particular user.

In some examples, the low energy electronic device 120 continues transmitting the user identifier signal 152 during a second time period 162. Once the second time period 162 has elapsed, the low energy electronic device 120 changes into a two-way communication or messaging mode 142 for a third time period 142. In the two-way communication mode 408, the low energy electronic device 120 can receive a confirmation signal 158 from the portable electronic device 114 upon successful receipt of the user identifier 152.

When the low energy electronic device 114 receives a confirmation signal 158 from a portable electronic device 114, the low energy electronic device 120 can switch into "sleep mode" or other dormant state. This ability to quickly return to a dormant state allows the low energy electronic device 114 to consume far less power than traditional near-field communication techniques. In some examples, the cycle number 154 represents the number of times the low energy electronic device 120 has completed the three time periods and transmitted their associated signals.

In some examples, the low energy electronic device 120 can, m response to user input or failure to receive confirmation, enter a repeat broadcast mode. After the third time period has elapsed, the low energy electronic device 120 can be configured to return to broadcasting the generic wake-up signal and restarting the three time periods, and cycling through these. Repeatedly broadcasting the signals may be useful in cases where the low energy electronic device 120 has not received a confirmation from a portable electronic device 114.

The low energy electronic device 120 can allow the user to provide input as to whether a repeating broadcast is desirable. For example, the low energy electronic device may have two pre-established user input types. A first user input type instructs the low energy electronic device 120 to complete the three time periods (one cycle) once, as discussed herein. Thus, the low energy electronic device 120 will broadcast the generic wake-up signal, the user identifier signal, and then wait for confirmation in two-way confirmation mode. This first user input may conserve battery life and prevent too many portable electronic devices from receiving the signal. A first input type can be a single button push. However, any other user input can serve as the first input type.

A second user input type can instruct the low energy electronic device to continue broadcasting the signals in the three time periods in a repeating loop (continuous or repeating cycles). This can be referred to as a repeat broadcast mode. In this example, the low energy electronic device 120 broadcasts the generic wake-up signal for the first time period, and then the user identifier signal for the second time period. The low energy electronic device 120 switches into the two-way communication mode for the third time period. Once the third time period has elapsed the low energy electronic device 120 restarts transmitting the generic wake-up signal, and the cycle repeats. In this way a user who wants to ensure that it reaches as many different portable electronic devices 114 as possible can cause the low energy electronic device 120 to initiate the second user input type to repeat the transmissions continuously. In some examples, the second user input type can be initiated by the user in accordance with the type of low energy electronic device. In one example, with the low energy electronic device comprising a portable, self-contained device, the user can initiate the second user input by pressing an input button several times (e.g., three times) in quick succession, which switches the low energy electronic device into the repeat broadcast mode, such as for emergency or panic purposes. Upon entering the repeat broadcast mode, the low energy electronic device can signal the user that the repeat broadcast mode has been initiated. For example, the low energy electronic device can comprise a haptic feedback device (e.g., a vibration or other similar haptic device) that the processor causes to be initiated in response to receiving the second user input type (i.e., the low energy electronic device can vibrate for a pre-determined period of time, or for a specific number of times (e.g., three times)). This can confirm to the user that the low energy electronic device is in the repeat broadcast mode. In some examples, each time the low energy electronic device 120 completes a cycle, a cycle number 154 is transmitted to the portable electronic device 114 indicating how many cycles have been completed.

When a low energy electronic device 120 is in the repeat broadcast mode, the server system 102 can track the location of the low energy electronic device 120 over time by transmitting the repeated signals for the respective time periods to multiple portable electronic devices equipped with the associated application. Thus, the multiple detected locations and the resulting generated path of a user or an object with the low energy electronic device can be stored on the server system 102 based on each location sent in by a portable electronic device 114 that has the associated user identifier. In some examples, the server system 102 can predict a future path and potential locations for a low energy electronic device 120 based on past locations.

Furthermore, when the low energy electronic device 120 is in repeat broadcast mode, the low energy electronic device 120 can transmit the generic wake-up signal and the user identifier signal to a plurality of portable electronic devices 114. Each time a respective portable electronic device 114 receives these signals, the respective portable electronic device 114 will respond with a confirmation signal 158, notifying the low energy electronic device 120 that the signals have been received and the user identifier has been sent to the server system 102 (along with the location of the respective portable electronic device 114). Upon receipt of the confirmation signal 158 from a non-paired portable electronic device 114, the low energy electronic device 120 signals the user that a portable electronic device 114 has transmitted the user identifier and the location of the portable electronic device 114 to the server system 102. For example, the low energy electronic device can initiate the haptic feedback device to vibrate for a pre-determined period of time or for a specific number of times (e.g., vibrate one time) to notify the user that a portable electronic device 114 has received the signals and transmitted the user identifier to the server system 102. In this way, a user can know if and when the low energy electronic device 120 in repeat broadcast mode connects to a portable electronic device 114. In an emergency situation, being alerted that the low energy electronic device 120 had connected to a portable electronic device, and thus, that an emergency signal had been sent to the server system 102 can allow a user to appropriately react to this information.

The repeat broadcast mode can be operated until further user input (e.g., pressing the button) causes the repetition to cease or the low energy electronic device 120 runs out of power. In some examples, the low energy electronic device 120 can broadcast on repeat for up to five days or more, depending upon the power source. In another example, the repeat broadcast mode can be terminated in the event the paired portable electronic device receives the repeating signals. In this case, the paired portable electronic device can be operated to send a confirmation signal to the low energy electronic device 120. Upon receipt of the confirmation signal, the low energy electronic device 120 switches to the dormant or sleep mode, and also signals the user that the broadcast repeat mode has been terminated. For example, the low energy electronic device can initiate the haptic feedback device to vibrate for a pre-determined period of time or for a specific number of times (e.g., vibrate two times) to notify the user that the low energy electronic device 120 is out of the repeat broadcast mode.

Figure 3:
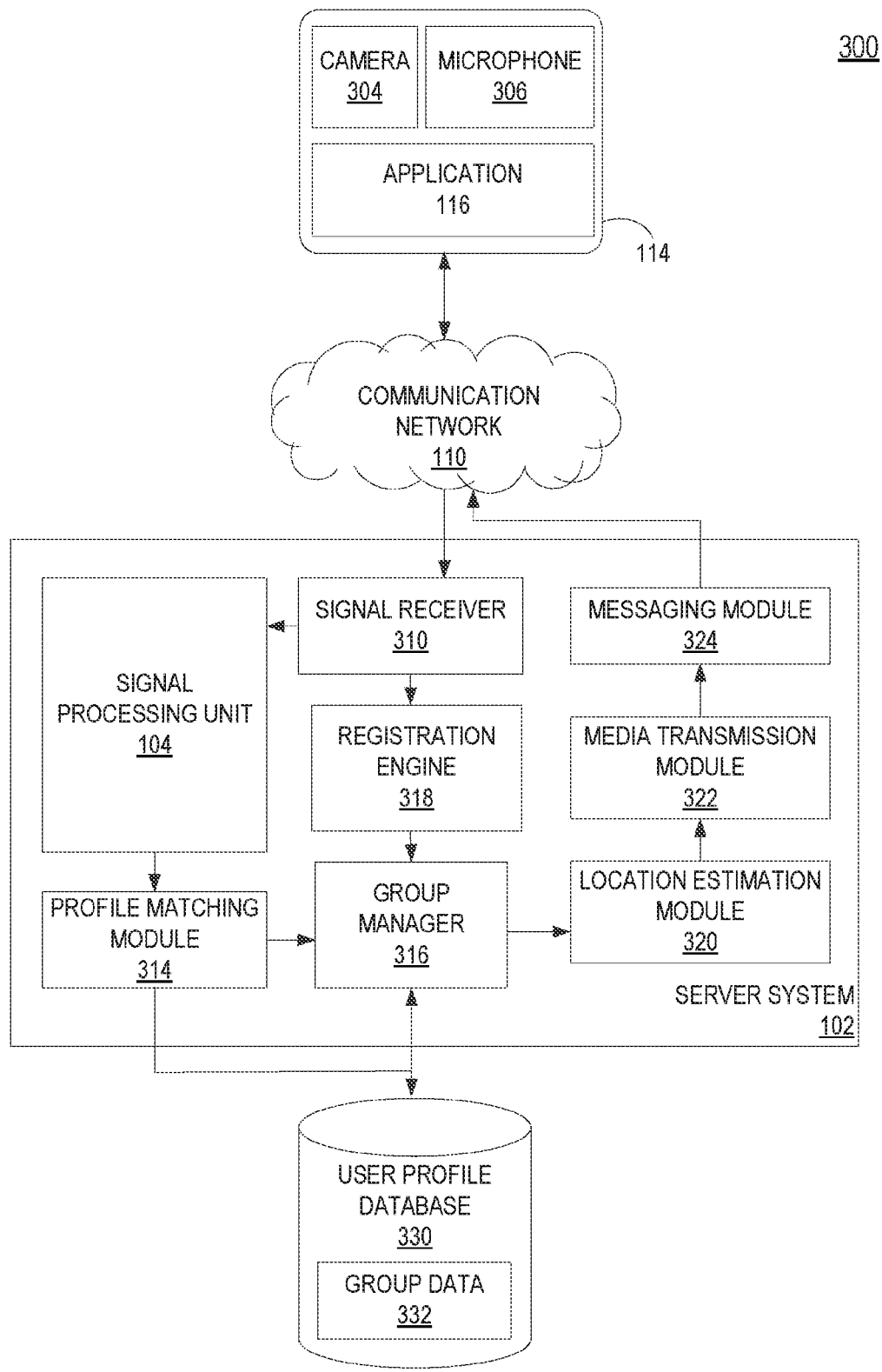
FIG. 3 illustrates a block diagram further illustrating the server-client system, in accordance with some examples.

FIG. 3 is a block diagram further illustrating a server-client system, in accordance with some example embodiments. In some examples, the server client system 300 includes a server system 102, a portable electronic device 114, and a communication network 110 to connect the server system 102 and the portable electronic device 114, The server system 102 can include a signal receiver 310, a signal processing unit 104, a profile matching module 314, a group manager 316, a location estimation module 114, a media transmission module 322, and a message module 324. In some examples, the server system 102 can include a user profile database 330 and associated group data 332.

In some examples, the portable electronic device 114 includes an application 116, a camera 204, and a microphone 206. The portable electronic device 114 receives a generic wake-up signal having a generic wake-up identifier from a low energy electronic device, as discussed above, and as shown in FIG. 1. In response, the personal portable electronic device 114 activates the application 116. Once activated, the application 116 receives the user identifier from the low energy electronic device, as this is transmitted with the user identifier signal. Upon receipt, the portable electronic device 114 transmits the user identifier and a location of the portable electronic device 114 to the server system 102.

In some examples, such as in the case where the user identifier matches a stored user identifier at the portable electronic device 114, the application 116 can activate one or more components of the portable electronic device 114, such as to activate the camera 304, microphone 306, or both for the purpose of recording audio data, visual data, or both. The application 116 transmits the recorded audio and/or visual data to the server system 102.

In some examples, the signal receiver 310 receives communications from the portable electronic device 114 via the communication network 110. In some examples, communications include receiving user identifiers and the location from one or more portable electronic device 114. In addition, the signal receiver 310 can receive audio and video data from a portable electronic device 114.

In some examples, the signal processing unit 312 analyzes the received communications (e.g., data packets) and extracts pertinent information (such as a user identifier, a location, and a device identifier from the sending portable electronic device).

In some examples, a profile matching module 314 accesses the user profile database 230 to identifier a user profile associated with the received user profile. The user profile database 230 includes a plurality of user profiles. Each user profile stores at least one user identifier for the specific user and group data 332. In some examples, the group data 332 can comprise a list of user identifiers, each user identifier is a 32 bit value representing a particular low energy electronic device 120 and the user associated with that device. The list of user identifiers in a particular user profile in group data 332 can represent the users connected to the user associated with the particular user profile.

In some examples, a user can connect his or her user profile with those of their friends and family or others, as needed or desired. In addition, a user can determine the level of connection with each other member. The level of connection can determine which information is sent to the user when the low energy electronic device of the user is activated. For example, the server system 102 may receive recorded visual and audio data from a portable electronic device 114 associated with the user. The server system 102 can only send the recorded visual and audio data to users who have a sufficient level of connection or are otherwise designated to receive such data from the user. In addition, the user can designate one or more other users as a key connected user. In some examples, the server system 102 will initiate one of an audio call, a video call, a livestreaming conference, or similar live communication event with the key connected user upon receiving the user identifier of a user with a selected key connected user.

When the server system 102 receives location data from more than one portable electronic device 114, the location estimation module 114 can use the location of one or more the portable electronic devices 114 to estimate the current location of the low energy electronic device 120.

In some examples, the group manager 316 accesses the group data 332 to identify one or more users in a group with the user associated with the user identifier. If the portable electronic device 114 is paired with the low energy electronic device, the media transmission module 322 transmits audio and visual data to portable electronic devices of the users in the group data 332. As noted above, in some examples, only members that have been specifically selected by the user will receive the recorded video and audio data. In some examples, the message module 324 transmits an estimated location to one or more users in the list of group data 332.

Figure 4:
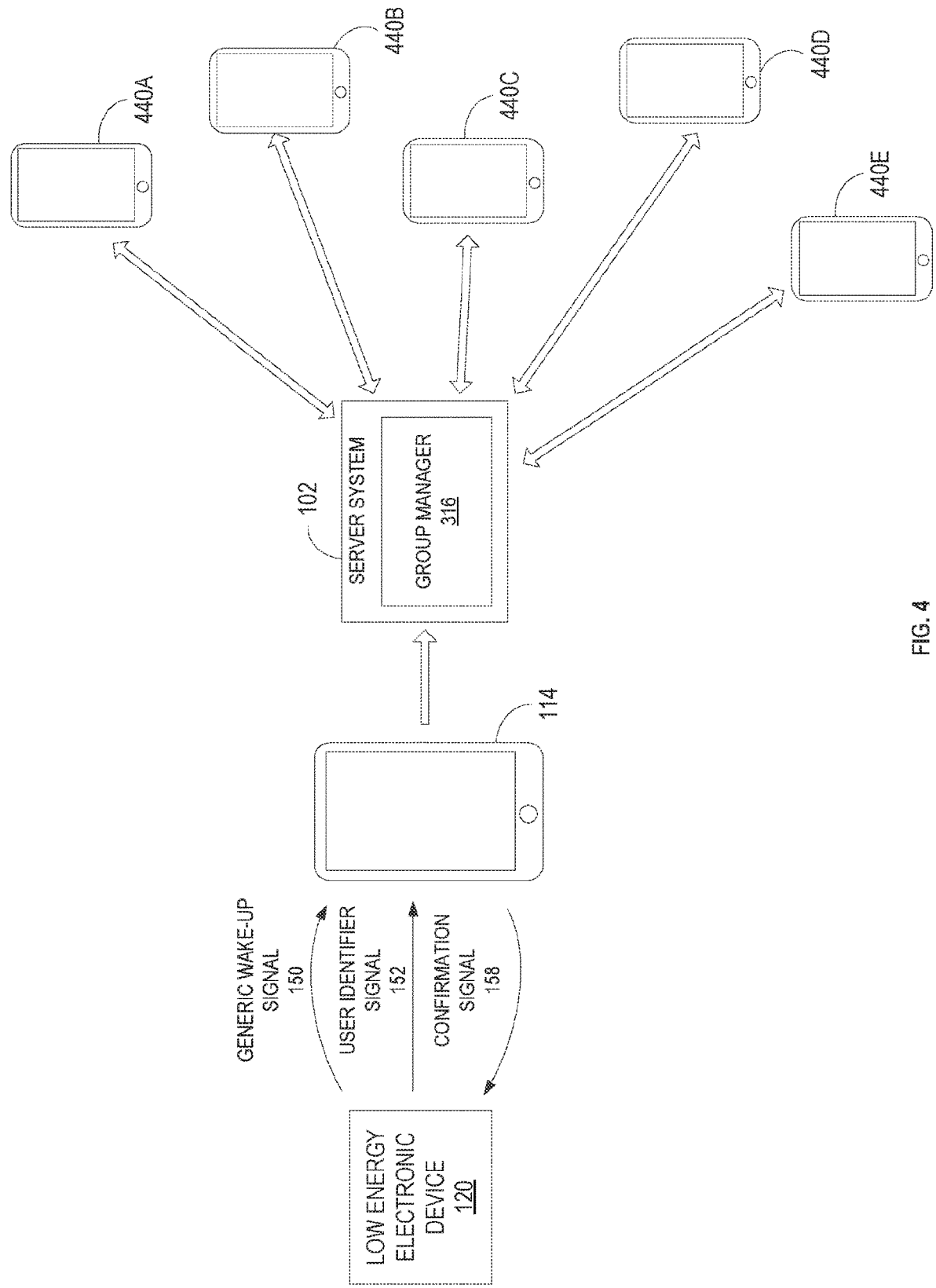
FIG. 4 is a diagram illustrating a system for transmitting information from a low energy electronic device through a portable electronic device and a server system to a plurality of portable electronic devices associated with a group of users, in accordance with some example embodiments.

FIG. 4 is a diagram illustrating a system for transmitting information from a low energy electronic device through a portable electronic device and a server system to a plurality of portable electronic devices associated with a group of users, in accordance with some example embodiments. In some examples, a low energy electronic device 120 communicates with a portable electronic device 114. Initially, upon receiving user input, the low energy electronic device 120 transmits a generic wake-up signal 150 comprising a generic wake-up identifier to the portable electronic device 114. As noted above, the low energy electronic device 120 uses a one-way transmission protocol to broadcast the generic wake-up signal 150.

In response, the portable electronic device 120 activates an associated application in response to the generic wake-up signal 150. In some examples, after a period of time, the low energy electronic device 102 stops broadcasting the generic wake-up signal 150 and begins broadcasting a user identifier signal 152. In some examples, the user identifier within the user identifier signal 152 is associated with a particular user and a particular portable electronic device 120.

It should be noted that the communications from the low energy electronic device 120 (generic wake-up signal, user identifier signal, location information, and any recorded visual and audio data) can be encrypted, both between the low energy electronic device 102 and the portable electronic device and between the portable electronic device 114 and the server system 102. In some examples, the encryption key may be created based on the MAC address of the low energy electronic device 120 or the portable electronic device 114. The encryption can be performed using any appropriate encryption algorithm (e.g., symmetrical encryption algorithms, asymmetrical encryption algorithms, and so on). In addition, the specific algorithm can be changed as needed to ensure secure communication. Any keys can also be changed as needed.

After transmitting the user identifier signal 152, the low energy electronic device 120 switches into a two way communication mode (e.g., a Bluetooth communication protocol). While in the two-way communication mode, the low energy electronic device 120 can receive communications from a portable electronic device 114. For example, the low energy electronic device 120 receives a confirmation signal 158 from the portable electronic device 120 that the user identifier signal 152 has been received. As discussed above with respect to FIG. 2 a confirmation signal 158 can cause a low energy electronic device to switch into "sleep mode" or other dormant state.

In some examples, the portable electronic device 114 transmits the user identifier signal 152 and a location associated with the portable electronic device 114 to a server system 102. In some examples, the portable electronic device 114 may not have access to a computer network (e.g., a cell phone may be out of cell tower range). In this case, the portable electronic device 114 can store the relevant data (e.g., user identifier, location, and, potentially, recorded visual and audio data) and then transmit it when a network becomes available. This situation may occur during a flight (when no internet connection is available), wherein the portable electronic device 114 can transmit accumulated location and other data when an internet connection again becomes available. The set of locations will represent the path the user took on his or her flight.

In some examples, the server system 102 includes a group manager 316 that uses the user identifier signal 152 to identify a user group. In some examples, the user group is stored in a user profile database (e.g., database 330 in FIG. 3). The user profile for a respective user can include a user group field for that respective user. The user group field for the respective user can include a list of user identifiers, each user identifier associated with a user connected to the respective user.

In some examples, the group manager 316 determines, for each respective user identifier in the list of user identifiers, a device identifier associated with the respective user identifier. A device identifier for a respective user identifier represents the portable electronic device paired with the respective user. The server system 102 can use the identified device identifiers to transmit data to an electronic device associated with the device identifier. In this way the group manager 316 sends data to each of the identified one or more users via the paired devices listed in their respective user profiles (e.g., see portable electronic devices 430A-430E.)

The data transmitted by the server system 102 can vary based on the data received from the portable electronic device. For example, if the portable electronic device 114 transmits recorded or streamed visual and audio data to server system 102, the server system 102 can relay this data to the electronic devices associated with each user in the group of identified user 440A-440E. However, if the server system 102 receives no such data (e.g., because the sending portable electronic device was not paired with the low energy electronic device it received the user identifier from) then the server system 102 will only transmit the location of the portable electronic device 114 or estimated location of the low energy electronic device.

Figure 5:
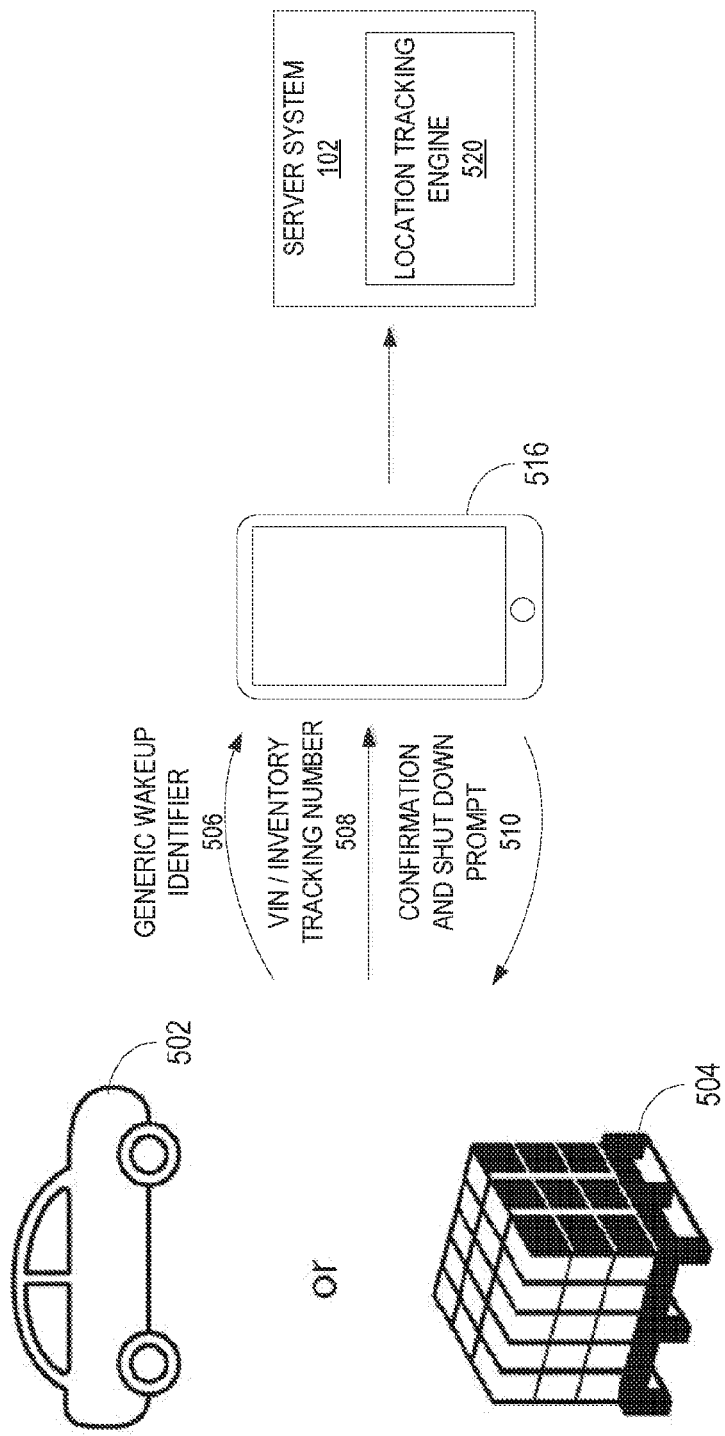
FIG. 5 is a flow diagram illustrating a process to enable communication between a low energy electronic device and one or more receiving devices, in accordance with some examples.

FIG. 5 is a flow diagram illustrating a process to enable communication between a low energy electronic device and one or more receiving devices, in accordance with some example embodiments. As will be recognized by those skilled in the art, the present technology is not limited to a personal or portable low energy electronic device (e.g., one that is carried), such as the above-discussed panic button carried by a user for use in emergency or other distressful situations. Indeed, in some examples, a low energy electronic device can be configured to be included in one of several possible locations, such as onboard a vehicle 502 or an inventory pallet 504. Initially, and without explicit user input or request, the low energy electronic device transmits a generic wake-up signal 506. This generic wake-up signal 506 can be received by any proximate or nearby portable electronic devices within range of the low energy electronic device, for example, by portable electronic device 516. If the portable electronic device 516 has the application associated with the low energy electronic device installed, the application will be activated and the portable electronic device 516 can communicate information to the server system 102.

After a first time period, the low energy electronic device can begin transmitting identifying information 508 to the portable electronic device 516 associated with the object or product to which the low energy electronic device 120 is associated with. For example, in the case of the vehicle 502, the onboard low energy electronic device can transmit a vehicle identification number to the portable electronic device 516. Similarly, in the case of the inventory pallet 504, the low energy electronic device can transmit an inventory tracking number to the portable electronic device 516 depending on the specific object being tracked.

In some examples, the portable electronic device 516 forwards the identifying information 508 to the server system 102 along with the current location of the portable electronic device 516 in a similar manner as discussed above. The location tracking engine 520 updates the current location of the low energy electronic device based on the received location and the identifying information 508 (e.g., the VIN/Inventory Tracking Number). In this way, the location of objects can be tracked at significantly lower costs as compared to a traditional Bluetooth device or other near-field communication devices. Specifically, Bluetooth low energy devices are inexpensive to manufacture and use very little energy. So much so that a low energy electronic device may last up to 4 or 5 years without needing a new battery.

In some examples, the portable electronic device 516 transmits a confirmation and shut down prompt 510 to the low energy electronic device. A confirmation prompt 510 is a signal sent from the portable electronic device to a low energy electronic device 120 acknowledging that the broadcasted signals have been received. In some examples, the confirmation response further includes a shut-down prompt 510. A shut down prompt 510 is an instruction to the low energy electronic device 120 to return to a dormant or sleep mode. As noted above, quickly returning to a sleep mode allows the amount of power consumed to be significantly reduced over time. In response, the low energy electronic device goes into a non-transmitting mode for a period of time. In this way, the low energy electronic device reduces the overall amount of energy used. After a pre-determined time, the low energy electronic device 120 starts the cycle again, allowing continuous monitoring of the location of an object or person.

In some examples, a car with a low energy electronic device can be stolen. The server system can receive that VIN number Identification from one or more devices with the associated application installed. Once the server system determines the car has been stolen, it can issue a lock command. A portable electronic device or other device can relay the command to the stolen car and cause the stolen car to lock immediately, enabling the car to be recovered with minimal delay or danger.

Figure 6A:
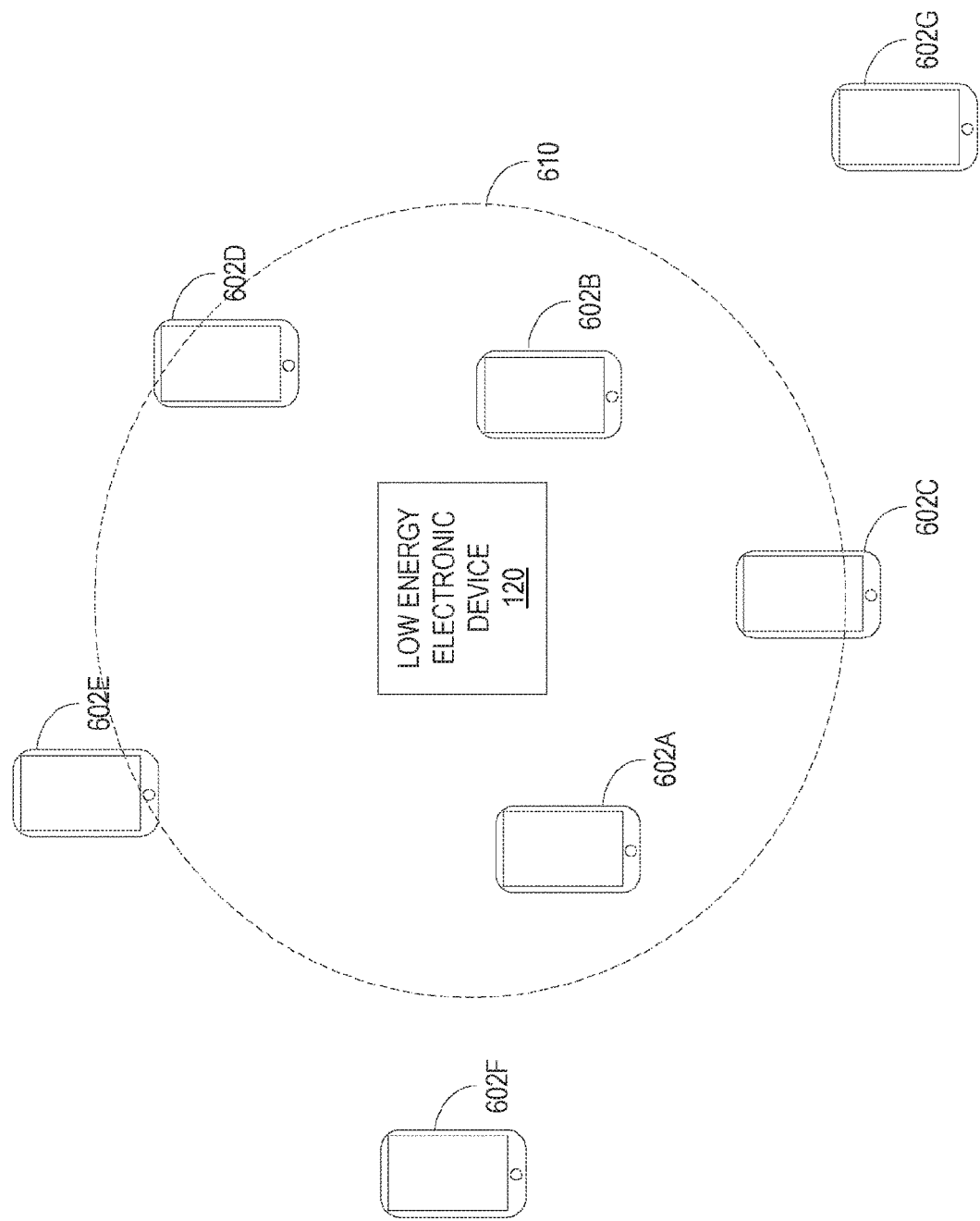
FIG. 6A is a diagram illustrating a low energy electronic device communicating with portable electronic devices with a given range, in accordance with some examples.

FIG. 6A is a diagram illustrating a low energy electronic device 120 attempting communication with a plurality of portable electronic devices 602A-602G, with the low energy electronic device 120 actually communicating with portable electronic devices 602A-602D within a given range, in accordance with some example embodiments. In this example, the low energy electronic device 120 is activated and begins broadcasting a generic wake-up signal. As discussed above in FIGS. 1 and 2, the low energy electronic device 120 transmits a 16 byte generic source identifier and a 32 bit generic wake-up identifier as part of a generic wake-up signal. Any portable electronic device with the associated application installed can activate the application in response to receiving the generic wake-up signal. However, the range at which the low energy electronic device 120 can broadcast is limited. In this example, the maximum range of the broadcast is represented by dotted circle. In some examples, the maximum range of a low energy electronic device can be 70-100 meters, but this is not intended to be limiting in any way. Depending on power use preferences of the user, the low energy electronic device 120 can reduce the amount of power used by transceiver, thus reducing the effective range of the generic wake-up signal.

All the portable electronic devices within the effective range (602A-602D) can receive the generic wake-up signal. In response, the devices (602A-602D) that receive the generic wake-up signal activate their respective applications.

As noted above, each respective portable electronic device 602A-602D that receives the generic wake-up signal will transmit a user identifier received from the low energy electronic device to a server system along with the location and device identifier of the respective portable electronic device. In this example, some of the portable electronic devices (e.g., 602E-602G) are outside the effective range, and thus do not receive the generic wake-up signal and thus do not wake-up in any way in response to the transmitted signal, nor do they transmit any signal or information to the server system.

Figure 6B:
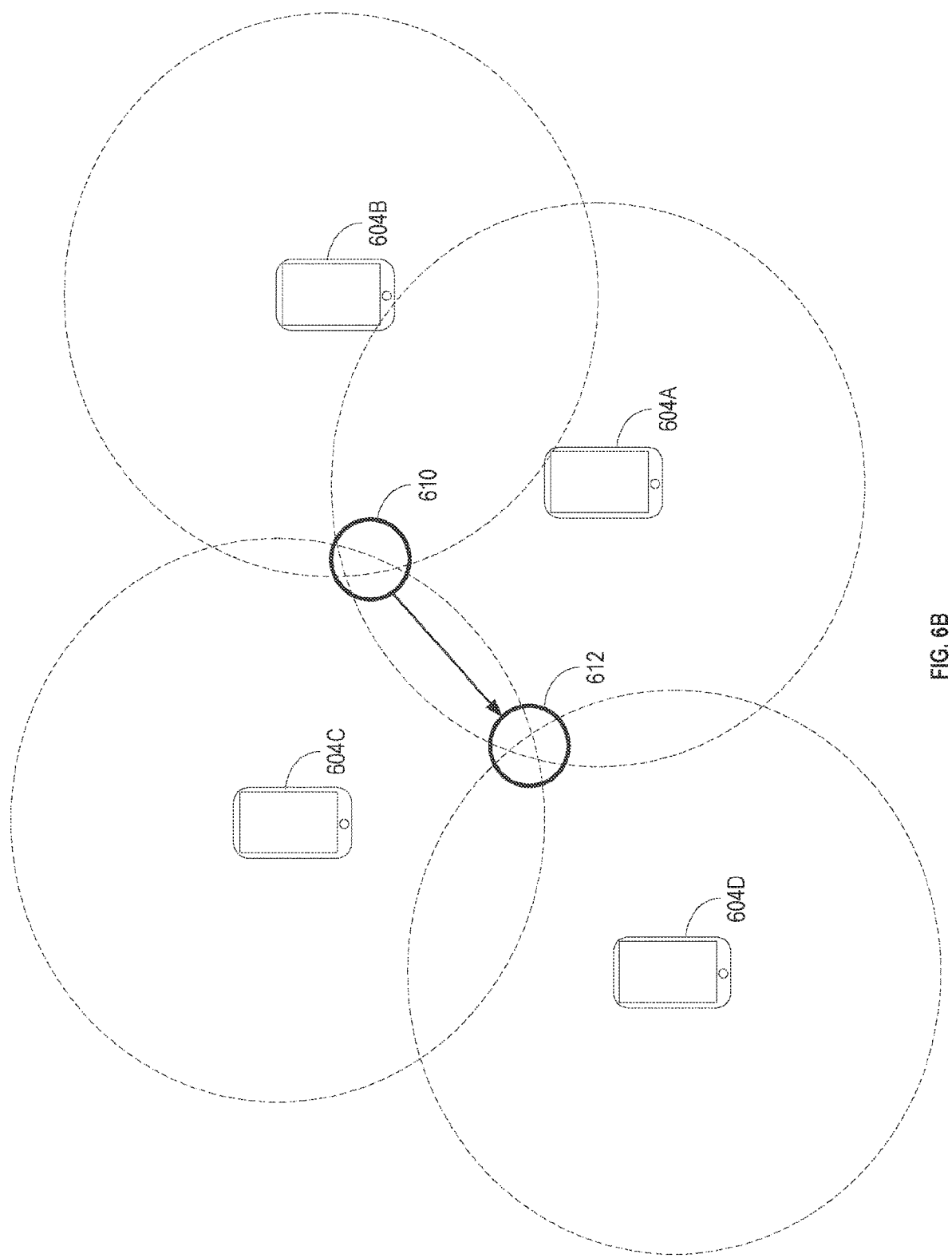
FIG. 6B is a diagram illustrating a server system method for estimating the location of a low energy electronic device based on the locations of portable electronic devices that transmit the user identifier to the server system, in accordance with some examples.

FIG. 6B is a diagram illustrating a server system and method for estimating the location of a low energy electronic device based on the locations of portable electronic devices 604A to 604D that transmit the user identifier to the server system, in accordance with some example embodiments.

In this example, the server system receives a location and a user identifier from three portable electronic devices 604A to 604C. In accordance with a determination that none of them are associated with the low energy electronic device (none of the device identifiers from the portable electronic devices 604A, 604B, or 604C are paired with the user identifier of the low energy electronic device), the server system estimates a likely location of the low energy electronic device. This estimation can be made using the location of each portable electronic device that has received the user identifier and transmitted it to the server system (e.g., system 102 in FIG. 1).

If only one portable electronic device transmits the user identifier to the server system, the server system can use the location of that portable electronic device as an estimate location. In other example embodiments, two or more portable electronic devices transmit a user identifier and a location to the server. In this example, the server system can use an average of their position as the estimated location.

In the current example, a low energy electronic device has transmitted a generic wake-up signal and then a user identifier signal in an area with four portable electronic devices (604A to 604D). The location of the low energy electronic device is not shown because the server system doesn't not know it. During a first time interval, the server system receives the user identifier from three of the portable electronic devices, 604A, 604B, and 604C.

As pictured, the server system can use the estimated range within which the portable electronic devices would receive the signal of the low energy electronic device and determine at least one position that would allow a low energy electronic device to reach all three portable electronic devices 604A-604C. In this example, during the first time interval, the server system estimates that the low energy electronic device is at location 610 because only in that location could all three portable electronic devices receive the signal.

After the server system generates a first estimate for the location of the low energy electronic device, the server system can receive a second set of user identifiers during a second time interval. The second set of signals comes from a different set of portable electronic devices (604A, 604C, and 604D). The server system can again use the positions of the portable electronic devices and the range of the low energy electronic device to identify one or more locations at which the low energy electronic device 120 could transmit to the devices that report the user identifier. In this second time interval, the low energy electronic device 120 appears to have moved, since portable electronic device 604B is no longer receiving signals or transmitting the user identifier, whereas portable electronic device 604D has begun to transmit the user identifier.

With the new set of portable electronic device locations, the server system identifies a new estimated location 612 as the estimated location of the low energy electronic device. Using this updated estimated location, as well as additional updated estimated locations, the server system can potentially track the movement of the low energy electronic device. This is especially useful if the low energy electronic device is attached to a vehicle or other frequently moving object. As the vehicle or user moves, different devices can report receiving the user identifier signal. Once a pattern of movement is determined, the server system can estimate future movement. In other example embodiments, the portable electronic devices can use an internal accelerometer to estimate movement, only turning on a GPS device occasionally to correct any wrong guesses. This allows the portable electronic devices to avoid using the GPS device, which uses more power than the accelerometer. It is noted that the location of the portable electronic devices can be obtained and transmitted through the installed application even if location functionality is not authorized or enabled in the settings of the portable electronic device.

It should be noted that each portable electronic device can include a radio and that radio could generate a received signal strength indicator (RSSI) for the received signal. The RSSI value of a signal can allow the portable electronic devices to estimate a distance between the sending low energy electronic device and the receiving portable electronic device. A portable electronic device can send the RSSI to the server system and the server system can use this signal to generate a more accurate estimate.

For example, a maximum range for a low energy electronic device may be 100 meters. If two portable electronic devices both transmit a user identifier for the low energy electronic device to the server system, the amount of area that is within 100 meters of each device may be quite large. However, if the RSSI value estimates that the low energy electronic device is within 40 meters of the first portable electronic device and within 30 meters of the second portable electronic device, the amount of area in which the low energy electronic device can be found is significantly reduced.

Figure 7:
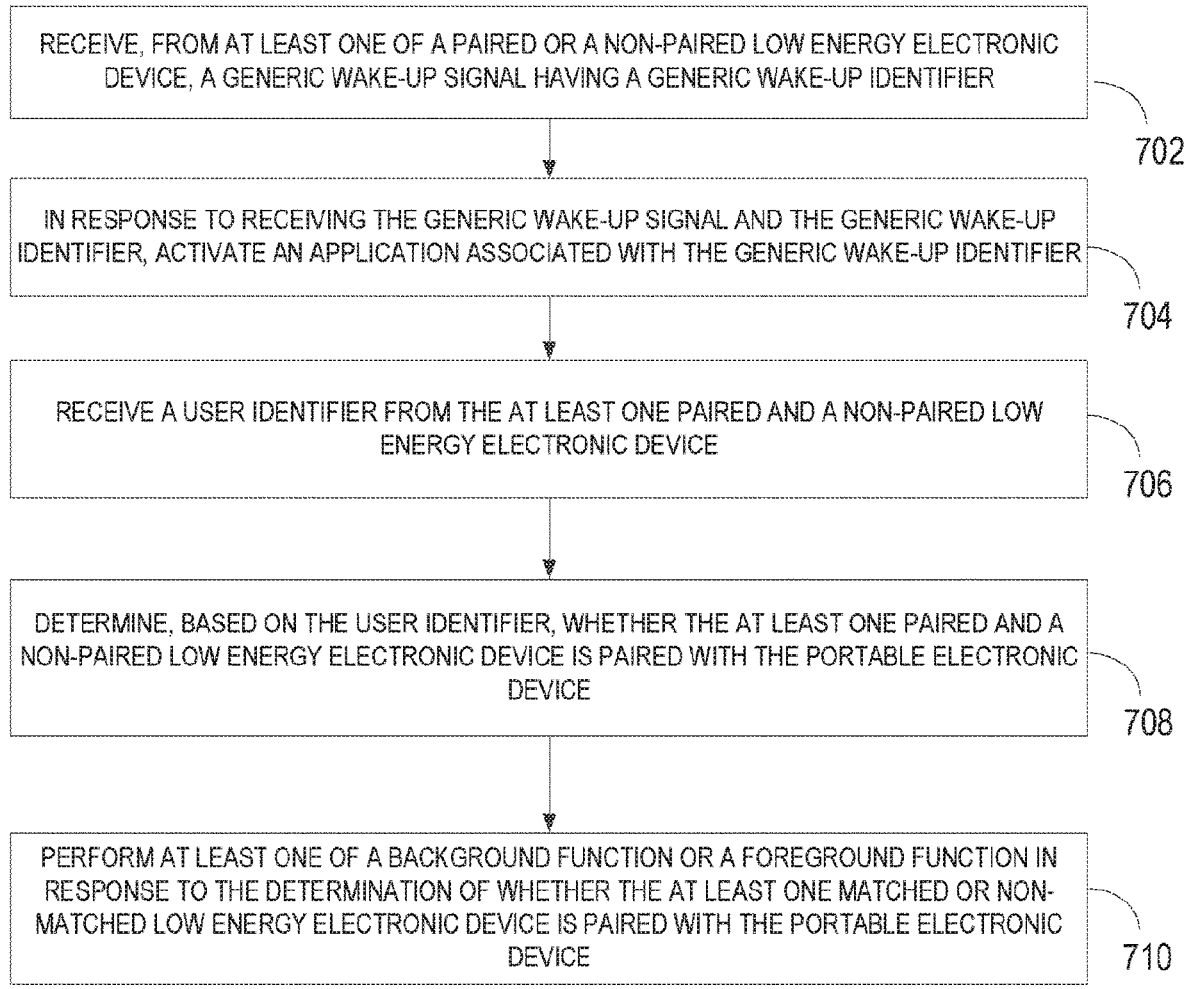
FIG. 7 is a flow diagram illustrating a method, in accordance with some example embodiments, for responding to either a paired or non-paired low energy electronic device.

FIG. 7 is a flow diagram illustrating a method, in accordance with example embodiments, for responding to either a paired or non-paired low energy electronic device. Each of the operations shown in FIG. 7 may correspond to instructions stored in a computer memory or computer-readable storage medium. In some example embodiments, the method described in FIG. 7 is performed by a portable electronic device (e.g., devices 116A to 116C in FIG. 1). However, the method described can also be performed by any other suitable configuration of electronic hardware. In some examples, when a new low energy electronic device is purchased by a user, the user performs an initialization procedure. To do so, the user may access an application on a portable electronic device, such as a smartphone, and begin the registration. During the registration process, the portable electronic device receives a device registration request from a low energy electronic device.

The portable electronic device can receive a user identifier associated with a low energy electronic device to be paired with the portable electronic device, which user identifier can be referred to as a paired user identifier. As noted above, the paired user identifier can comprise a 32 bit value that is unique to the low energy electronic device (and by extension the user). The portable electronic device stores the paired user identifier associated with the low energy electronic device. Once the portable electronic device stores the paired user identifier, the portable electronic device and the low energy electronic device are considered paired.

A user can choose which portable electronic device is paired with the low energy electronic device by choosing which portable electronic device to use during registration. In other example embodiments, a user can choose to pair a low energy electronic device with more than one portable electronic device or pair more than one low energy electronic device with a given portable electronic device.

In some examples, the paired user identifier is received from the low energy electronic device. For example, the low energy electronic device can be manufactured with a unique user identifier already included in memory. In other example embodiments, the portable electronic device receives a paired user identifier by transferring the registration request to the server system and receiving from the server system a generated user identifier for the low energy electronic device. The server system ultimately stores user profiles containing one or more respective user identifiers for each user and can then ensure that no user identifies are replicated. In some aspects, the user identifier(s) can be stored on the portable electronic device.

Once registration is complete, in some examples, the user can activate their low energy electronic device, or in other examples, the low energy device can be configured to automatically transmit. In response to activation of the low energy electronic device, such as when activated by a user (e.g., by pushing a button or other input), the portable electronic device receives (702), from the paired low energy electronic device, a generic wake-up signal having a generic wake-up identifier. The portable electronic device of the user is further capable of receiving a generic wake-up signal from other low energy electronic devices not paired with the portable electronic device, as discussed herein.

In response to receiving the generic wake-up signal having the generic wake-up identifier, the portable electronic device can activate (704) an application associated with the generic wake-up identifier. In this context, activate can mean move from an off or dormant state into an active state. In some examples, the portable electronic device can activate the associated application in a discrete manner, such as without otherwise causing noticeable changes to the portable electronic device (e.g., no sounds are produced and the screen does not change). In this way the application can perform tasks in the background without interrupting or otherwise bothering the user.

The portable electronic device can be operable to receive (706) a user identifier from both paired and non-paired low energy electronic devices. Upon receipt of any user identifier from any low energy electronic device configured in accordance with the present technology as discussed herein, the portable electronic device can determine (708), based on the user identifier, whether the low energy electronic device whose signal is being received is paired with the portable electronic device.

In some examples, determining whether a given low energy electronic device is paired or not includes accessing a paired user identifier stored at the portable electronic device. The portable electronic device can compare the paired user identifier with the received user identifier to determine if there is a match. In accordance with a determination that the paired user identifier and the received user identifier match, the portable electronic device determines that the low energy electronic device and the portable electronic device are paired, thus facilitating certain actions. If no match exists, other or different actions can be facilitated.

In other example embodiments, the portable electronic device determines whether the portable electronic device and the low energy electronic device are paired by transmitting the received user identifier and a device identifier for the portable electronic device to a server system, and then receiving from the server system a determination concerning whether the low energy electronic device and the portable electronic device are paired based on information stored in a user profile associated with the received user identifier.

The portable electronic device can perform (710) at least one of a background function or a foreground function in response to the determination of whether the at least one low energy electronic device is paired with the portable electronic device. In accordance with a determination that the at least one low energy electronic device is paired with the portable electronic device and thus comprises a paired low energy electronic device the portable electronic device can be caused to perform a foreground function, such as activating at least one of the camera or the microphone to record at least one of image data or audio data, respectively.

The portable electronic device can then transmit the user identifier, any recorded image data and audio data, and the location of the portable electronic device to the server system.

In accordance with a determination that the at least one low energy electronic device is not paired with the portable electronic device, and thus comprises a non-paired low energy electronic device, the non-paired portable electronic device can be caused to perform a background function of transmitting the user identifier and the location of the portable electronic device to the server system.

In some examples, the portable electronic device can receive, at the same or different times, a plurality of generic wake-up signals from a plurality of low energy electronic devices, each of the generic wakeup signals comprising the same generic wake-up identifier (but different user identifiers), and each of the plurality of low energy electronic devices comprising one of a paired or non-paired (and thus a matched or a non-matched) low energy electronic device.

After transmitting the user identifier to the server system, the portable electronic device can transmit a non-paired confirmation signal (if the low energy electronic device is determined to be non-paired) to the low energy electronic device. In some examples, the non-paired confirmation signal causes the low energy electronic device to perform a first response and then switch into sleep mode. In some examples, the first response is a single vibration, or some other user feedback indicator.

After transmitting the user identifier to the server system, the portable electronic device can transmit a paired confirmation signal (e.g., if the low energy electronic device is determined to be paired) to the low energy electronic device. In some examples, the paired confirmation signal causes the low energy electronic device to perform a second response and then switch into sleep mode. The second response can be two sequential vibrations, or some other user feedback.

Figure 8:
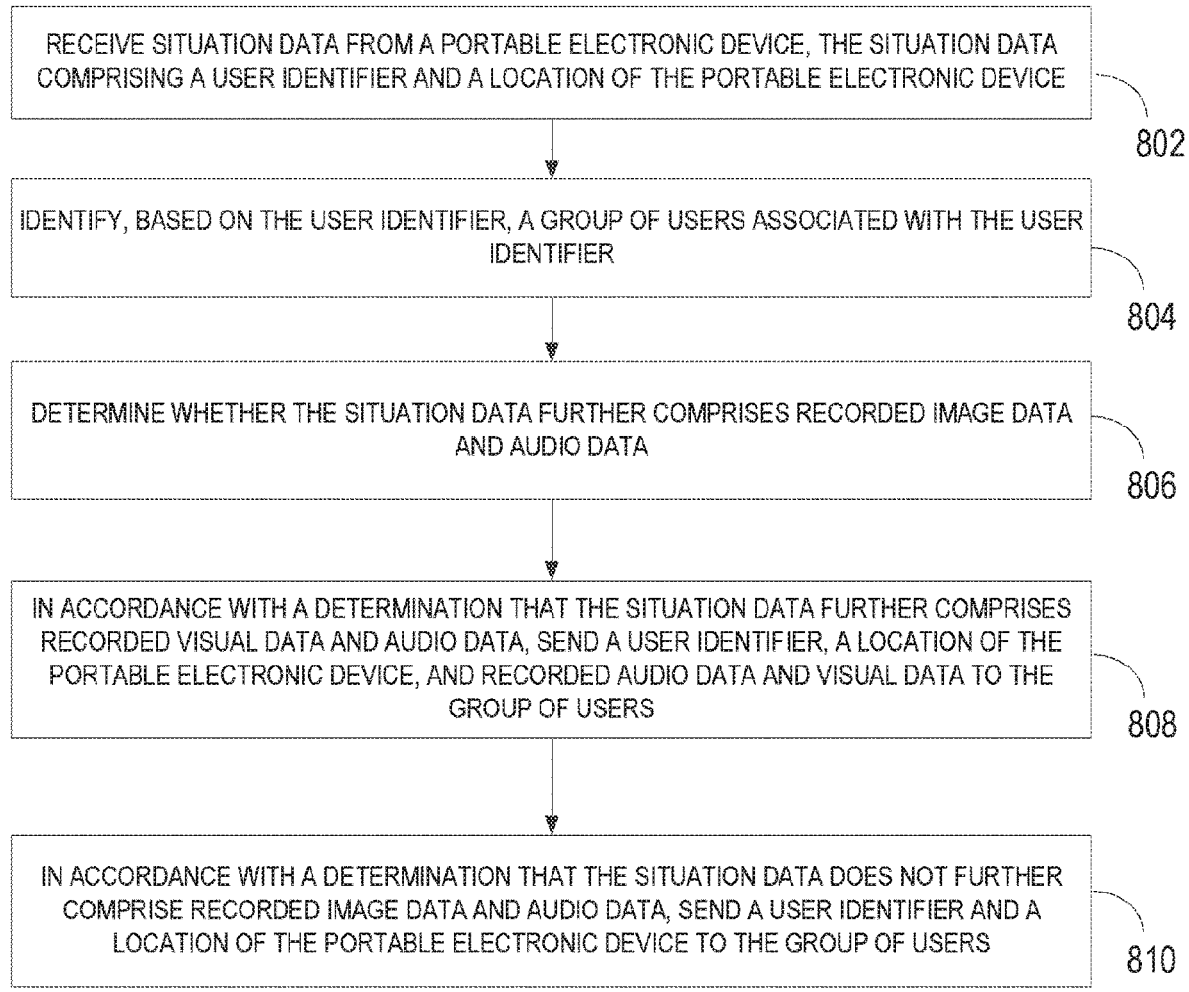
FIG. 8 is a flow diagram illustrating a method, in accordance with some example embodiments, for transmitting emergency information from a user to a group of predetermined users.

FIG. 8 is a flow diagram illustrating a method, in accordance with example embodiments, for transmitting information (e.g., emergency information, and other types) from a user to a group of predetermined users. Each of the operations shown in FIG. 8 may correspond to instructions stored in a computer memory or computer-readable storage medium. In some example embodiments, the method described in FIG. 8 is performed by a portable electronic device (e.g., devices 116A to 116C in FIG. 1). However, the method described can also be performed by any other suitable configuration of electronic hardware.

In some examples, a server system receives (802) situation data from a portable electronic device. Situation data may comprise, but is not limited to a user identifier and a location of the portable electronic device.

In some examples, the server system identifies (804), based on the user identifier, a group of users associated with the user identifier. In some examples, the server system accesses a user profile associated with the received user identifier. The user profile can include a list of connected users.

In some examples, the server system determines (806) whether the situation data further comprises recorded image data and audio data. In this way, the server system does not need to determine whether the portable electronic device is paired to a particular low energy electronic device. Instead, the portable electronic device makes that determination and only sends visual and audio data if the portable electronic device and the transmitting low energy electronic device are paired.

In accordance with a determination that the situation data further comprises recorded image data and audio data, the server system sends (808) the user identifier, a location of the portable electronic device, and recorded audio data and visual data to the group of users. In this way, a user can pre-select a group of users (e.g., friends, family, and so on) who will receive this data if the user activates the low energy electronic device. For example, if a user is a victim of a crime or attempted crime, they can activate the low energy electronic device and initiate a broadcast of their location and visual/audio data about their surroundings to the group, which enables those in the group to take appropriate steps to aid the user.

In accordance with a determination that the situation data does not further comprise recorded image data and audio data, the server system sends (810) the user identifier and a location of the portable electronic device to the group of users. In this way, when a low energy electronic device connects to a portable electronic device that it is not paired with, the application does not use the additional resources or bandwidth of the device. Instead, it sends the minimum amount of useful data and allows the non-paired portable electronic device to return to other tasks.

In some examples, the received situation data comprises the locations of two or more portable electronic device, As seen above in FIGS. 6A and 6B, the server system may generate an estimated location for a low energy electronic device based on the range of the low energy electronic device and the locations of the two or more portable electronic devices, Once a location is estimated, the server system transmits the estimated location of the low energy electronic device to the group of users.

Example Machine Architecture and Machine-Readable Medium

Figure 9:
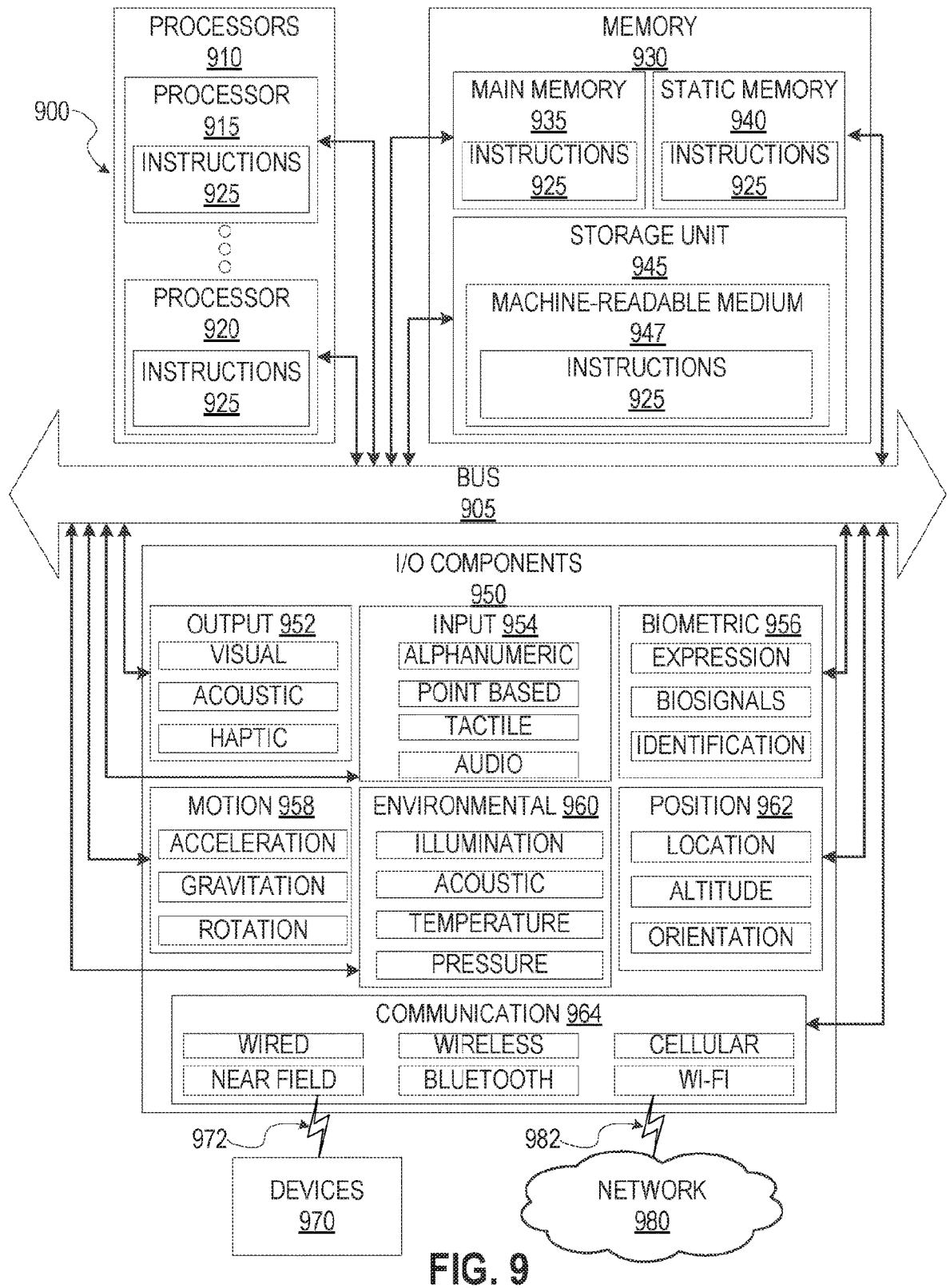
FIG. 9 is a block diagram illustrating components of a machine, according to some examples.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 925 (e.g., software, a program, an application, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 can operate in the capacity of a server machine or a client machine in a server-client network environment, or as a peer machine in a peer-to-peer (or distributed) network environment. The machine 900 can comprise, but be not limited to, a server computer, a client computer, a PC, a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 925, sequentially or otherwise, that specify actions to be taken by the machine 900. Further, while only a single machine 900 is illustrated, the term "machine" shall also be taken to include a collection of machines 900 that individually or jointly execute the instructions 925 to perform any one or more of the methodologies discussed herein.

The machine 900 can include processors 910, memory 930, and I/O components 950, which can be configured to communicate with each other via a bus 905. In an example embodiment, the processors 910 (e.g., a CPU, a reduced instruction set computing (RISC) processor, a complex instruction set computing (CIBC) processor, a graphics processing unit (GPU), a digital signal processor (DSP), an application specific integrated circuit (ASIC), a radio-frequency integrated circuit (RFIC), another processor, or any suitable combination thereof) can include, for example, a processor 915 and a processor 920, which can execute the instructions 925. The term "processor" is intended to include multi-core processors 910 that can comprise two or more independent processors 915, 920 (also referred to as "cores") that can execute the instructions 925 contemporaneously. Although FIG. 9 shows multiple processors 910, the machine 900 can include a single processor 910 with a single core, a single processor 910 with multiple cores (e.g., a multi-core processor), multiple processors 910 with a single core, multiple processors 910 with multiple cores, or any combination thereof.

The memory 930 can include a main memory 935, a static memory 940, and a storage unit 945 accessible to the processors 910 via the bus 905. The storage unit 945 can include a machine-readable medium 947 on which are stored the instructions 925, embodying any one or more of the methodologies or functions described herein. The instructions 925 can also reside, completely or at least partially, within the main memory 935, within the static memory 940, within at least one of the processors 910 (e.g., within the processor's cache memory), or any suitable combination thereof, during execution thereof by the machine 900. Accordingly, the main memory 935, the static memory 940, and the processors 910 can be considered machine-readable media 947.

As used herein, the term "memory" refers to a machine-readable medium 947 able to store data temporarily or permanently and can be taken to include, but not be limited to, random-access memory (RAM), read-only memory (ROM), buffer memory, flash memory, and cache memory. While the machine-readable medium 947 is shown, in an example embodiment, to be a single medium, the term "machine-readable medium" should be taken to include a single medium or multiple media (e.g., a centralized or distributed database, or associated caches and servers) able to store the instructions 925. The term "machine-readable medium" shall also be taken to include any medium, or combination of multiple media, that is capable of storing instructions (e.g., instructions 925) for execution by a machine (e.g., machine 900), such that the instructions 925, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 can include a wide variety of components to receive input, provide and/or produce output, transmit information, exchange information, capture measurements, and so on. It will be appreciated that the I/O components 950 can include many other components that are not shown in FIG. 9. In various example embodiments, the I/O components 950 can include output components 952 and/or input components 954. The output components 952 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further example embodiments, the I/O components 950 can include biometric components 956, motion components 958, environmental components 960, and/or position components 962, among a wide array of other components. For example, the biometric components 956 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 958 can include acceleration sensor components (e.g., accelerometer), gravitation sensor components, rotation sensor components (e.g., gyroscope), and so forth. The environmental components 960 can include, for example, illumination sensor components (e.g., photometer), acoustic sensor components (e.g., one or more microphones that detect background noise), temperature sensor components (e.g., one or more thermometers that detect ambient temperature), humidity sensor components, pressure sensor components (e.g., barometer), proximity sensor components (e.g., infrared sensors that detect nearby objects), and/or other components that can provide indications, measurements, and/or signals corresponding to a surrounding physical environment. The position components 962 can include location sensor components (e.g., a Global Position System (GPS) receiver component), altitude sensor components (e.g., altimeters and/or barometers that detect air pressure from which altitude can be derived), orientation sensor components (e.g., magnetometers), and the like.

Communication can be implemented using a wide variety of technologies. The I/O components 950 can include communication components 964 operable to couple the machine 900 to a network 980 and/or devices 970 via a coupling 982 and a coupling 972, respectively. For example, the communication components 964 can include a network interface component or another suitable device to interface with the network 980. In further examples, the communication components 964 can include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 can be another machine 900 and/or any of a wide variety of peripheral devices (e.g., a peripheral device coupled via a USB).

Moreover, the communication components 964 can detect identifiers and/or include components operable to detect identifiers. For example, the communication components 964 can include radio frequency identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals and so on. In addition, a variety of information can be derived via the communication components 964, such as location via Internet Protocol (IP) geolocation, location via Wi-Fi® signal triangulation, location via detecting an NFC beacon signal that can indicate a particular location, and so forth.

Transmission Medium

In various example embodiments, one or more portions of the network 980 can be an ad hoc network, an intranet, an extranet, a virtual private network (VPN), a LAN, a wireless LAN (WLAN), a WAN, a wireless WAN (WWAN), a MAN, the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 can include a wireless or cellular network and the coupling 982 can be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 925 can be transmitted and/or received over the network 980 using a transmission medium via a network interface device (e.g., a network interface component included in the communication components 964) and utilizing any one of a number of well-known transfer protocols (e.g., HTTP). Similarly, the instructions 925 can be transmitted and/or received using a transmission medium via the coupling 972 (e.g., a peer-to-peer coupling) to the devices 970. The term "transmission medium" shall be taken to include any intangible medium that is capable of storing, encoding, or carrying the instructions 925 for execution by the machine 900, and includes digital or analog communications signals or other intangible media to facilitate communication of such software.

Furthermore, the machine-readable medium 947 is non-transitory (in other words, not having any transitory signals) in that it does not embody a propagating signal. However, labeling the machine-readable medium 947 as "non-transitory" should not be construed to mean that the medium is incapable of movement; the medium should be considered as being transportable from one physical location to another. Additionally, since the machine-readable medium 947 is tangible, the medium can be considered to be a machine-readable device.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A low energy electronic device for communicating identifying information to a nearby portable electronic device, the low energy electronic device comprising:
   a transceiver operable to transmit and receive signals;
   a processing unit in communication with the transceiver, the processing unit being operable to:
      switch the transceiver into a one-way communication mode, wherein the transceiver transmits a generic wake-up signal comprising a universal unique identifier (UUID) and a generic wake-up identifier for a first time period, and transmits a user identifier signal comprising the UUID and a user identifier associated with a user or object for a second time period after the first time period has elapsed;
      switch the transceiver into a two-way communication mode after the second time period has elapsed to facilitate receipt of an incoming confirmation signal.

2. The low energy electronic device of claim 1, wherein the low energy electronic device comprises a portable self-contained unit having a housing in support of the transceiver, the processing unit, and a user interface.

3. The low energy electronic device of claim 2, wherein the user interface comprises one of a mechanical user interface, a biometric user interface, an electronic user interface, or an electromechanical user interface.

4. The low energy electronic device of claim 1, wherein the one-way communication mode utilizes a wireless low energy beacon communication protocol to transmit the generic wake-up signal and the user identifier signal to one or more nearby portable electronic devices.

5. The low energy electronic device of claim 1, wherein the UUID comprises a 16 byte source identifier, and wherein the generic wake-up identifier comprises a 32 bit generic wake up identifier from supplemental values.

6. The low energy electronic device of claim 1, wherein the UUID comprises a 16 byte source identifier, and wherein the user identifier comprises a 32 bit user identifier from supplemental values.

7. The low energy electronic device of claim 1, wherein the two-way communication mode uses a wireless low energy close proximity communication protocol to send data to and receive data from one or more nearby portable electronic devices.

8. The low energy electronic device of claim 1, wherein the first time period comprises a pre-determined duration of time between 1 and 5 seconds.

9. The low energy electronic device of claim 1, wherein the second time period comprises a pre-determined duration of time between 1 and 5 seconds.

10. The low energy electronic device of claim 1, wherein the user identifier comprises a 32 bit value that is pre-established to be associated with a low energy electronic device of the at least one low energy electronic device associated with the user or the object, or wherein the user identifier associated with the object comprises a VIN number or an inventory tracking number.

11. The low energy electronic device of claim 1, wherein the at least one low energy electronic device is operable within a system, the system comprising:

a plurality of low energy electronic devices, each low energy electronic device comprising a transceiver and a processing unit, wherein each low energy electronic device in the plurality of low energy electronic devices is operable to transmit the same generic wake-up identifier in response to being activated.

12. The low energy electronic device of claim 11, wherein each low energy electronic device in the plurality of low energy electronic devices comprises the same UUID.

13. The low energy electronic device of claim 11, wherein each one of the plurality of low energy electronic devices is matched to a respective specific portable electronic device.

14. The low energy electronic device of claim 1, wherein the low energy electronic device comprises is an integrated component operable within an existing electronics system.

15. The low energy electronic device of claim 1, wherein the processing unit is further operable to, in response to receiving a confirmation signal, switch the transceiver into sleep mode.

16. The low energy electronic device of claim 1, wherein the processing unit is further operable to remain in two-way communication mode for a third period of time and, after the third period of time has elapsed, return to the one-way communication mode.

17. The low energy electronic device of claim 1, wherein the processing unit is further operable to:
cause the low energy electronic device to enter a repeat broadcast mode, and
while in the repeat broadcast mode, continuously loop between the first, second, and third time periods and broadcast the associated generic wake-up and user identifier signals over time to a plurality of portable electronic devices having an application associated with the generic wake-up identifier, wherein the repeat broadcast mode facilitates the transmission of multiple respective locations of the plurality of portable electronic devices and the user identifier to the server system by the plurality of portable electronic devices, and generation of a path of the user or object associated with the low energy electronic device based on each location transmitted by the plurality of portable electronic devices.

\* \* \* \* \*